April 12, 1966     E. P. HANSON     3,245,614
TYPE COMPOSING METHOD AND APPARATUS
Original Filed Aug. 1, 1960     16 Sheets-Sheet 15

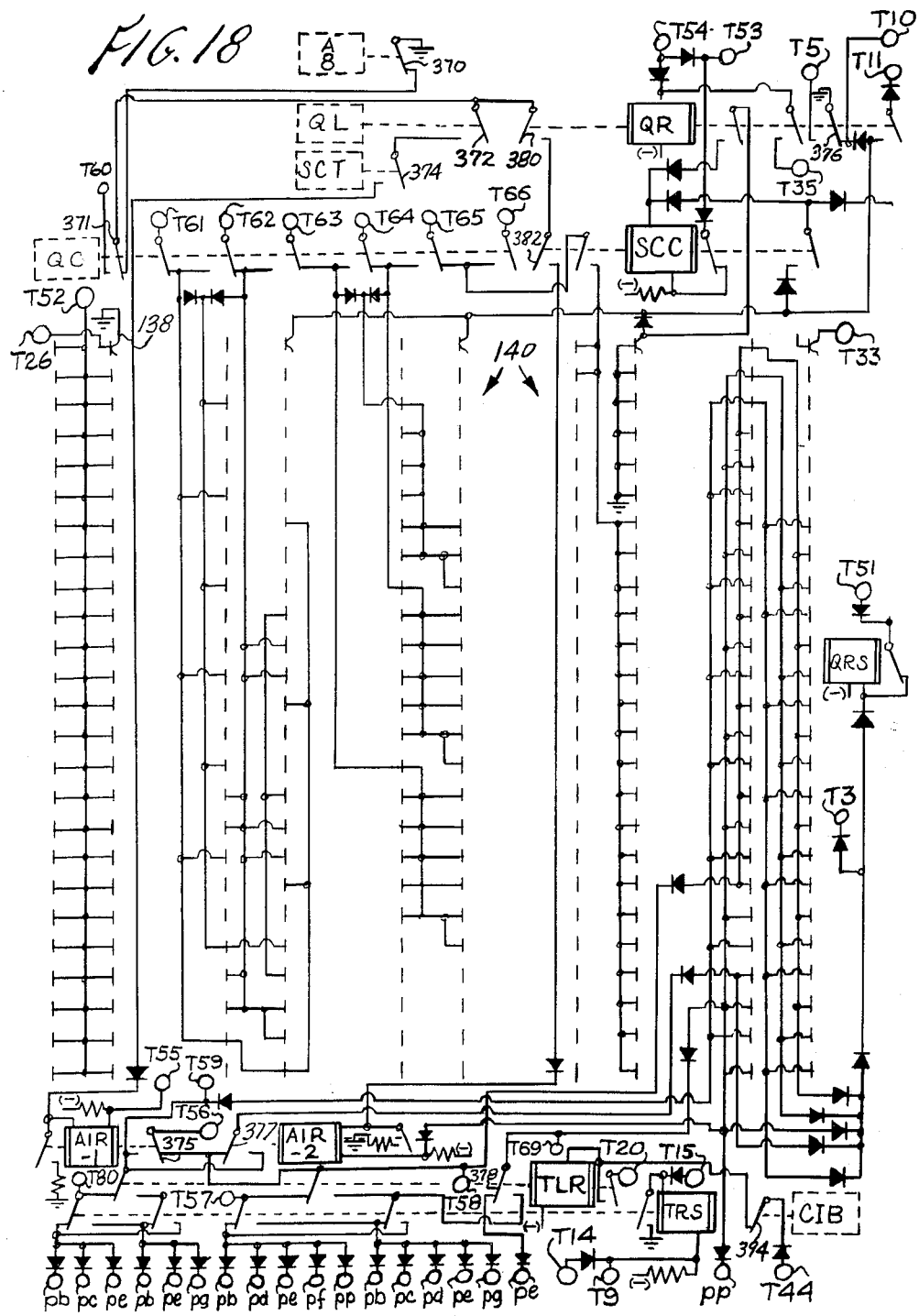

3,245,614
TYPE COMPOSING METHOD AND APPARATUS
Ellis P. Hanson, Rockport, Mass., assignor to Photon, Inc., Cambridge, Mass., a corporation of Massachusetts
Original application Aug. 1, 1960, Ser. No. 46,423, now Patent No. 3,171,592, dated Mar. 2, 1965. Divided and this application Feb. 23, 1965, Ser. No. 430,240
7 Claims. (Cl. 234—1)

This is a division of my copending application Serial No. 46,423, filed August 1, 1960, Patent No. 3,171,592, dated March 2, 1965, which was a continuation-in-part of Serial No. 21,740, filed April 12, 1960, now abandoned.

The present invention relates generally to apparatus for perforating a coded tape according to information suitable for operation of a linecasting machine.

Presently known apparatus is available for perforating a paper tape which is later fed through a tape reader for controlling the operation of a linecasting machine. The principal object of this invention is to provide improved apparatus for making the perforations in the tape, whereby certain defects and limitations of the previously known apparatus can be eliminated.

An important object of this invention is to provide means for eliminating from the tape those errors that result from typographical mistakes of the operator that are recognized at or before the completion of typing of the lines in which they occur. In a presently known tape perforator, all errors of typing result in corresponding tape perforations, and it is either necessary to punch out all code positions in the tape for each such line to prevent it from operating the linecasting machine, or to resort to elaborate methods and apparatus for editing the tape to eliminate such errors.

Another object of this invention is to provide quadding and indention controls whereby these functions, when ordered by appropriate operation of the keyboard, result in one or more successive punched codes in the tape, these codes containing the proper information for operation of the linecasting machine to insert spaces or leaders of sufficient total width to accomplish these operations, taking into consideration the total widths of the characters selected for the line and the selected justified line length.

It will be understood that while the present invention has been characterized above with reference to the perforation of a coded tape, such as a paper tape, the objects thereof are considered to include the recording of corresponding information on a magnetic tape, or on any other known medium capable of representing the coded information in an analogous manner.

Other objects of the invention relates to special functions of the tape coding machine designed to facilitate the operation of a linecasting maching therefrom, and these will be more clearly understood with reference to the following description.

With the foregoing objects and others hereinafter to be described in view, a principal feature of this invention resides in the provision of a suitable memory device, hereinafter referred to as a "register," which initially receives coded information for each line consecutively entered into the machine by operation of the keys of a character keyboard and other controls relating to the manner in which it is desired to compose the line. In general, these other controls relate to such functions as the setting of the desired justified line length in terms of a multiple of a given unit of space, the indention of one or both margins of the line, quadding to the right, left or center, and the separation of the selected words or characters by leader characters or spaces representing a total width sufficient to produce a justified line.

Another feature relates to means for reading the coded information in the register consecutively, and for perforating a tape according to the information. In general, the codes in the register corresponding to selected characters are transferred directly to the tape, while the codes for such operations as indention and quadding produce automatic sequencing operations resulting in the sequential perforation of a plurality of codes intended for operation of the linecasting machine in accordance with the corresponding operation.

Other features of the invention, as well as variations in the procedures generally described above, relate to certain details of the tape perforating machine as hereinafter described in detail with reference to a preferred embodiment thereof.

In the drawings, FIG. 1 is a block diagram showing the general organization of a tape perforating machine according to this invention;

FIGS. 2 to 10 and 12 to 18 are schematic circuit diagrams of the parts of the machine of FIG. 1. FIG. 2 shows the circuit for operation of the hammers which enter coded information into the register;

FIG. 3 shows the decimal-to-binary width converter circuit;

FIG. 4 shows the width accumulator circuit for accumulating the widths of the selected characters and the minimum spaceband widths in each line, said circuit being of the same type used elsewhere in the machine as a spaceband expansion accumulator for accumulating the available expansion of spacebands selected in the line;

FIG. 5 shows the circuit for operation of a set of indicator lights representing the minimum additional space required in a line to bring it to a length suitable for justification by the spacebands if an assigned fixed space is added to each spaceband;

FIG. 6 shows a comparison circuit which indicates the momentary relationship between the line "deficit" (that is, the difference between the justified line length and the total of character and minimum spaceband widths) and the value in the spaceband expansion accumulator;

FIG. 7 shows the circuits for operation of indicator lights showing the deficit and the maximum additional space that may be added to a line without causing its length to exceed the maximum value for which justification is accomplished by adding an assigned fixed space to each spaceband;

FIG. 8 shows controls operated from the keyboard to direct insertion of em and en leaders or spaces at particular positions in the line;

FIG. 9 shows the reader for sensing the information in the register and for producing the sequential operations depending thereon;

FIG. 10 shows controls associated with a command for a rail shift on the linecasting machine, said rail shift operation being well-known in existing machines of this type and further described below under the heading "Shifting the Rail";

FIG. 12 shows circuits for sensing certain codes combinations in the register;

FIG. 13 shows controls for the margins, also referred to as "indention" controls;

FIG. 14 shows controls for word and character spacing;

FIG. 15 shows controls for inserting blank spaces or leader characters;

FIG. 16 shows the circuit for operation of the tape perforating solenoids, also referred to as the "punch circuit";

FIG. 17 shows the circuit for controlling the perforation of consecutive code sequences in the tape for quadding a line to the left; and FIG. 18 shows a circuit for quadding a line to the right, including the circuit for controlling the entry of coded information to the tape from the quadding circuits of FIGS. 17 and 18.

General description

Figure 2:
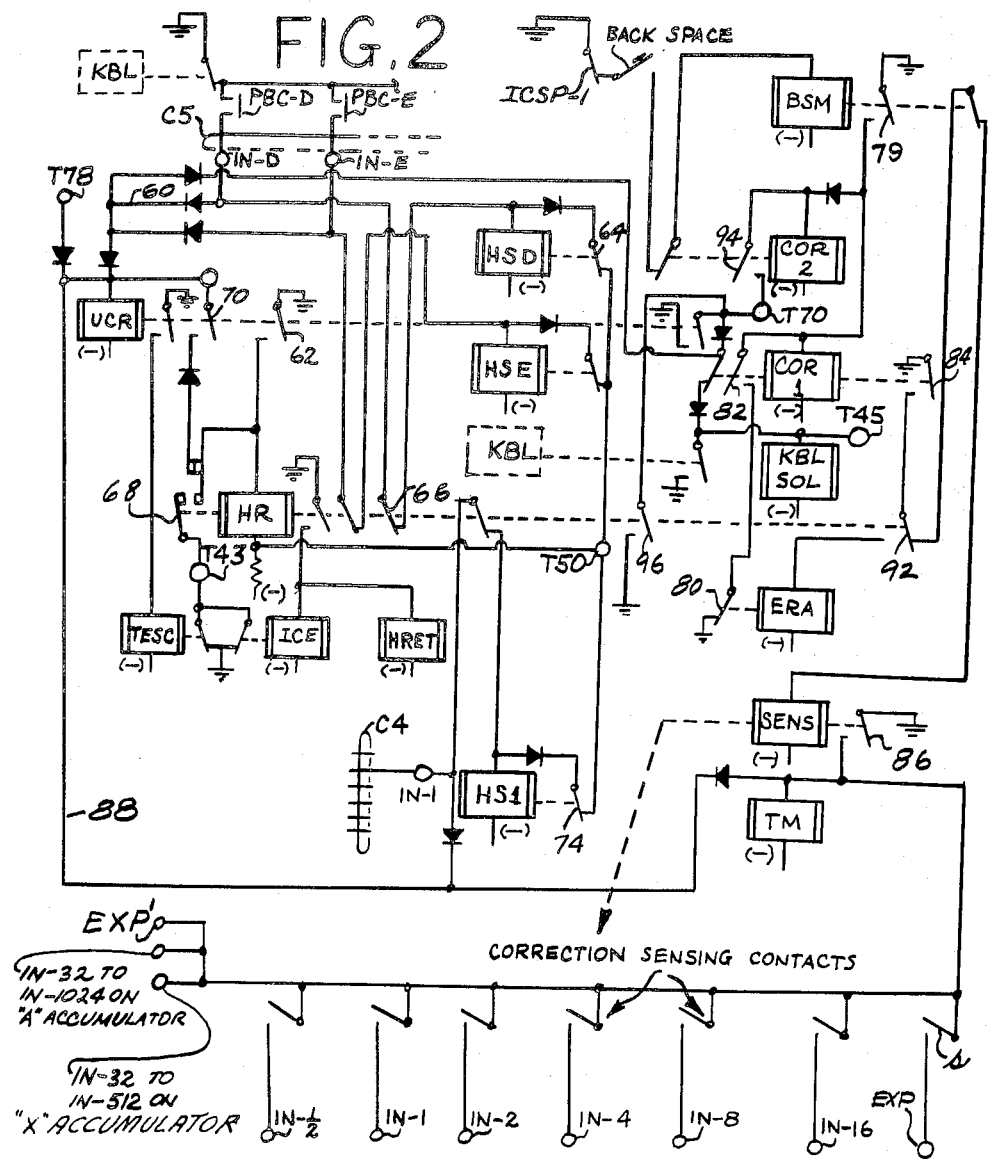

Referring to the drawings, the circuit diagrams illustrate the various relays and solenoids in mechanical association with their respective contacts, all contacts being illustrated in the positions reached when the corresponding relays and solenoids are in the unenergized condition. Relays and solenoids illustrated in certain figures by dotted outlines are elsewhere shown in full outlines together with the corresponding energizing circuits. It is assumed that a source of electrical potential supplying either direct or alternating current of adequate capacity is provided for all operative parts of the machine, this source being connected between the frame of the machine designated ground and a bus designated as (—). It will be noted that many of the relays and solenoids have one lead directly connected to (—), while others are connected to (—) through a resistance. Referring to FIG. 2 for example, the solenoid ERA is connected directly to (—), while the relay HR is connected to (—) through a resistance. The latter relay is energized by connection of its other, or energizing, lead to ground, and the relay may be deenergized either by disconnection of its energizing lead from ground or by connection of a lead from a terminal T50 to ground, this latter connection forming a shunt circuit around the energizing coil. In the latter case, this resistance is shunted across the source of potential and must be of sufficient current carrying capacity for the voltage developed by the latter. In the following description the connection to any such relay which shunts its operating coil to deenergize it will be referred to simply as a "shunt connection" and the relay will be described as "shunted."

An understanding of the illustrated machine is based upon a recognition of the basic mode of representation of the width of each character or space in a line to be represented by the tape. To each selectable matrix in the linecasting machine is assigned a width value equal to a selected multiple of an elemental width unit arbitrarily designated as "½." The width of each character and space may be represented by some combination of the binary values ½, 1, 2, 4, 8 and 16. An em space is assigned the value "16," an en space the value "8," and a "thin" space the value "4," although it will be understood that these values are arbitrarily assigned and may be changed if desired. It will be understood that the units employed in this machine have been selected to correspond to the widths of the space units employed in the matrices of linecasting machines in common use, and the width unit system is entirely arbitrary from the standpoint of the teachings of this invention.

In general, the selection of characters and other information at the keyboard of the machine results in the entry of width information to the register and to other circuits including the width and spaceband expansion accumulators by means of which information is indicated to the operator, for example by indicator lights, to indicate the capacity of the machine at each moment during the typing of a line to produce a justified line of type through the appropriate perforation of the tape. On the other hand, the coded information in the tape does not include a direct numerical representation of width values of any kind, and each unique code in the tape merely represents the identity of a specific matrix to be selected by the linecasting machine. It will be apparent, therefore, that the widths of the matrices employed in the linecasting machine must be capable of representation by the same width codes employed in representing the respective characters and spaces in the register.

It will be understood by those familiar with conventional linecasting machines that the justification of lines is ordinarily accomplished through the use of special matrices known as "spacebands" between the words in the line of type. These spacebands are expandable members which are capable of width-wise expansion to provide word spaces of variable widths. Each spaceband has a minimum width and a maximum width, the difference between these widths being designated the "maximum expansion."

It will also be understood that in a linecasting machine every line may be said to be "justified," in the sense that the total of the widths of the characters, spaces and spacebands represented in the tape must necessarily equal a justified line length, assigning to each spaceband its minimum width with or without an incremental width not exceeding the "maximum expansion."

The perforated tape which is used in the described machine is preferably identical to the tape which is commonly employed in a so-called "Teletypesetter" operation, and the individual codes entered in the tape are herein described as being identical to those commonly used by a "Teletypesetter" machine to represent the individual matrices. The tape, not illustrated, has six perforation positions in the transverse dimension herein designated as the B, C, D, E, F and G positions which correspond respectively to the positions 0, 1, 2, 3, 4 and 5 in the "Teletypesetter" code.

Register-actuating circuits

We next turn to a description of the circuits actuated by the keyboard for entering information in the register. The register is preferably of the type described in the patent to Higonnet and Moyroud No. 2,690,249, and includes a frame to support a number of columns of depressible pins. Each keyboard selection which is to enter a unique code in the register results in the depression of a corresponding combination of the pins in a single column of the register. The number of columns available in the register is sufficient to include all the codes that may be necessary for representing any given line of type. In general, each column will therefore represent a character, a space, a spaceband, or a special code representing a quadding, leader or indention operation. In the described machine, for example, 100 such columns are provided. Each pin may assume either of two stable positions, namely, an "unactuated" position into which all pins are retracted before the entry of a new code, preferably when the old code has been sensed, and an "actuated" position to which certain combinations of pins are driven by associated hammers to represent the selected codes. There are 15 pins in each column respectively designated S, A, B, C, D, E, F, G, ½, 1, 2, 4, 8, 16 and P. For characters, the codes entered in the pins B, C, D, E, F and G are eventually sensed and transferred to the correspondingly identified perforator positions in the tape punching circuit. The widths of the characters are entered in the positions designated ½, 1, 2, 4, 8 and 16. The pin designated A is actuated to represent upper case characters. The pin designated S is actuated when codes other than those designating characters are entered in the register to represent word spaces or special operations such as quadding or leaders, hereinafter described. The pin designated P in each column is actuated when the total of the pins B, C, D, E, F and G in that column that are actuated is an even number. This is used in connection with a parity checking circuit hereinafter described. Referring to FIG. 2 an input carriage escapement solenoid designated ICE is energized to step an input carriage having a number of hammers from one column to the next in the register. There is a hammer for each pin in a column, the 15 hammers being respectively located to actuate corresponding pins in a single column.

Figure 9:
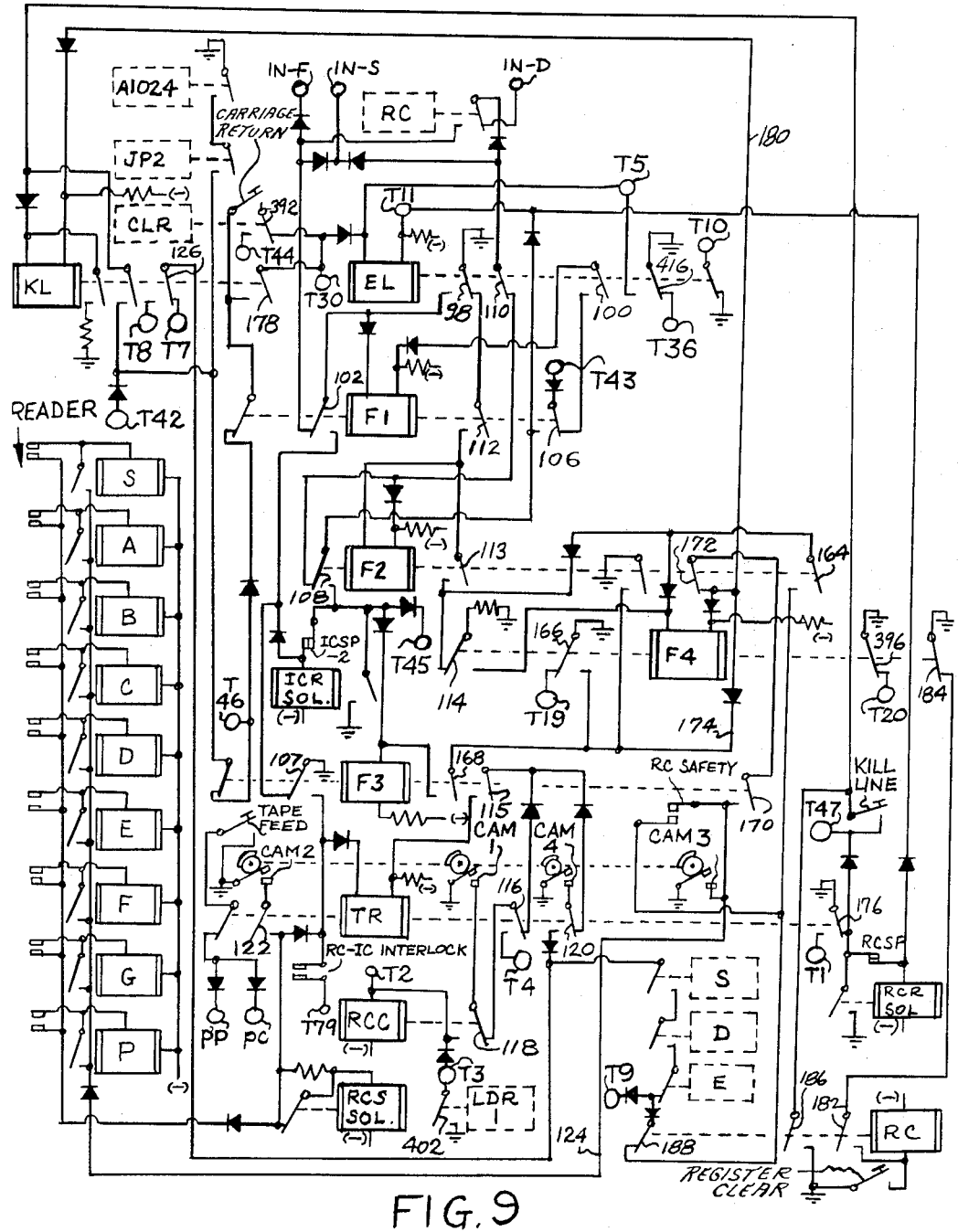
Figure 14:
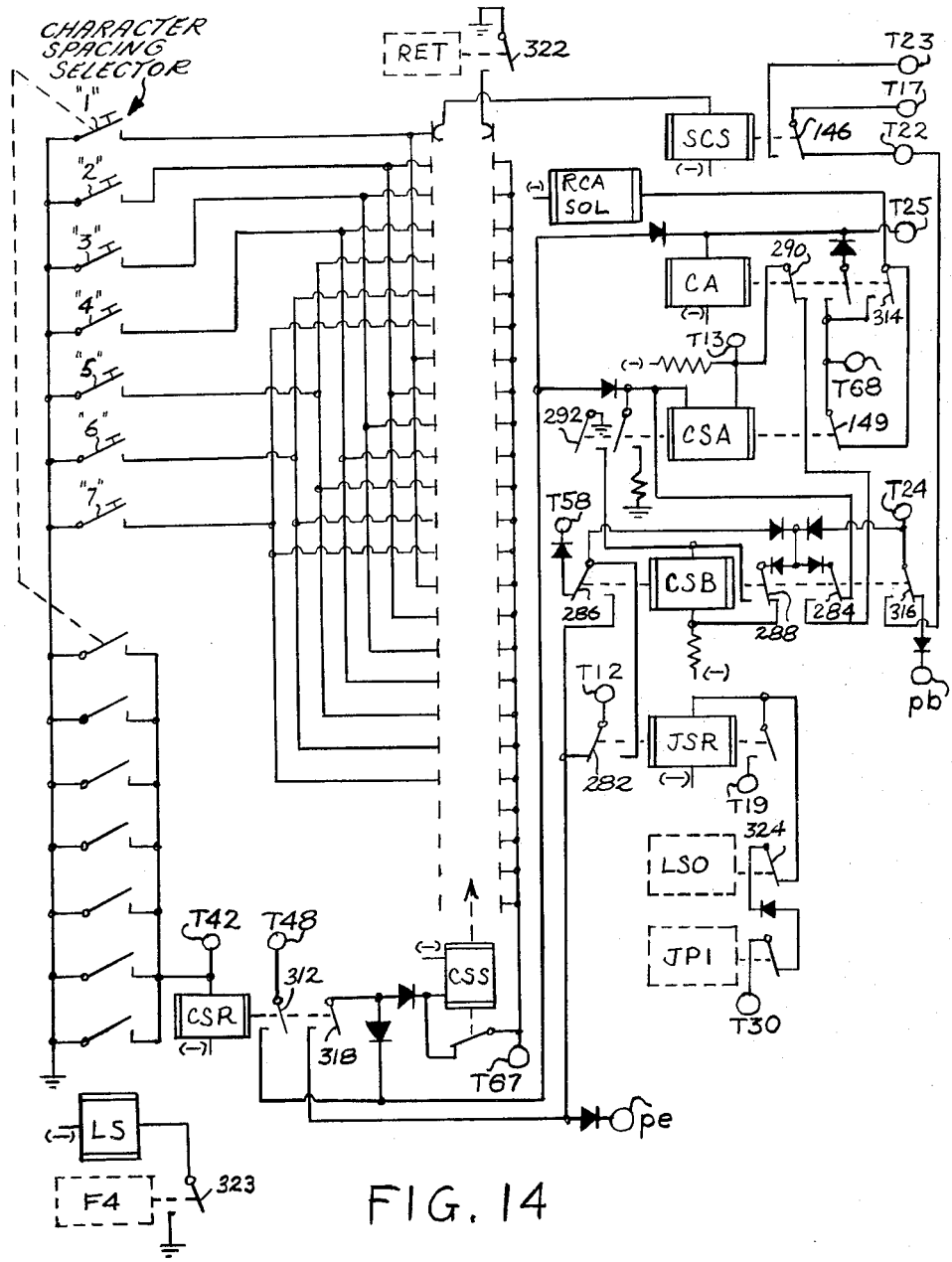

On the opposite side of the register from the input carriage is a reading carriage having a number of sensing contacts designated "Reader" in FIG. 9, there being a sensing contact for each pin in a single column. A reading carriage advance solenoid RCA SOL shown in FIG. 14 is energized to advance the reading carriage from one column to the next in the register.

In accordance with said Patent No. 2,690,249, correction of any code stored in the register may be accomplished by retraction of the actuated pins in the corresponding column, provided this is accomplished before the given line is terminated. To this end a backspace magnet BSM (FIG. 2) is energized to engage and move the typewriter escapement and the input carriage backwards one position each time a key designated BACK SPACE is depressed. In addition to the hammers, the input carriage also has a number of correction sensing contacts opposite the width-representing pins, shown in the lower part of FIG. 2. Operation of a correction sensing solenoid SENS causes these contacts to sense the positions of the width-representing pins of the erroneously-selected character for the purpose of subtracting this width from the previously-accumulated total of widths in the selected line. A solenoid ERA is energized after the sensing operation to retract all pins representing the erroneously-typed character. Referring to FIG. 9, an input carriage return solenoid designated ICR SOL is energized to return the input carriage to the starting end of the register after each line has been typed. A reading carriage return solenoid designated RCR SOL is energized to return the reading carriage, after each line in the register has been sensed, to a starting position one step in advance of the first column in which pins are depressed, as explained below. Referring again to FIG. 2, a typewriter escapement solenoid TESC is energized to escape the typewriter platen during the typing of a line. In general, during the typing of a line the input carriage and the typewriter escapement solenoids ICE and TESC are energized substantially simultaneously.

Figure 1:
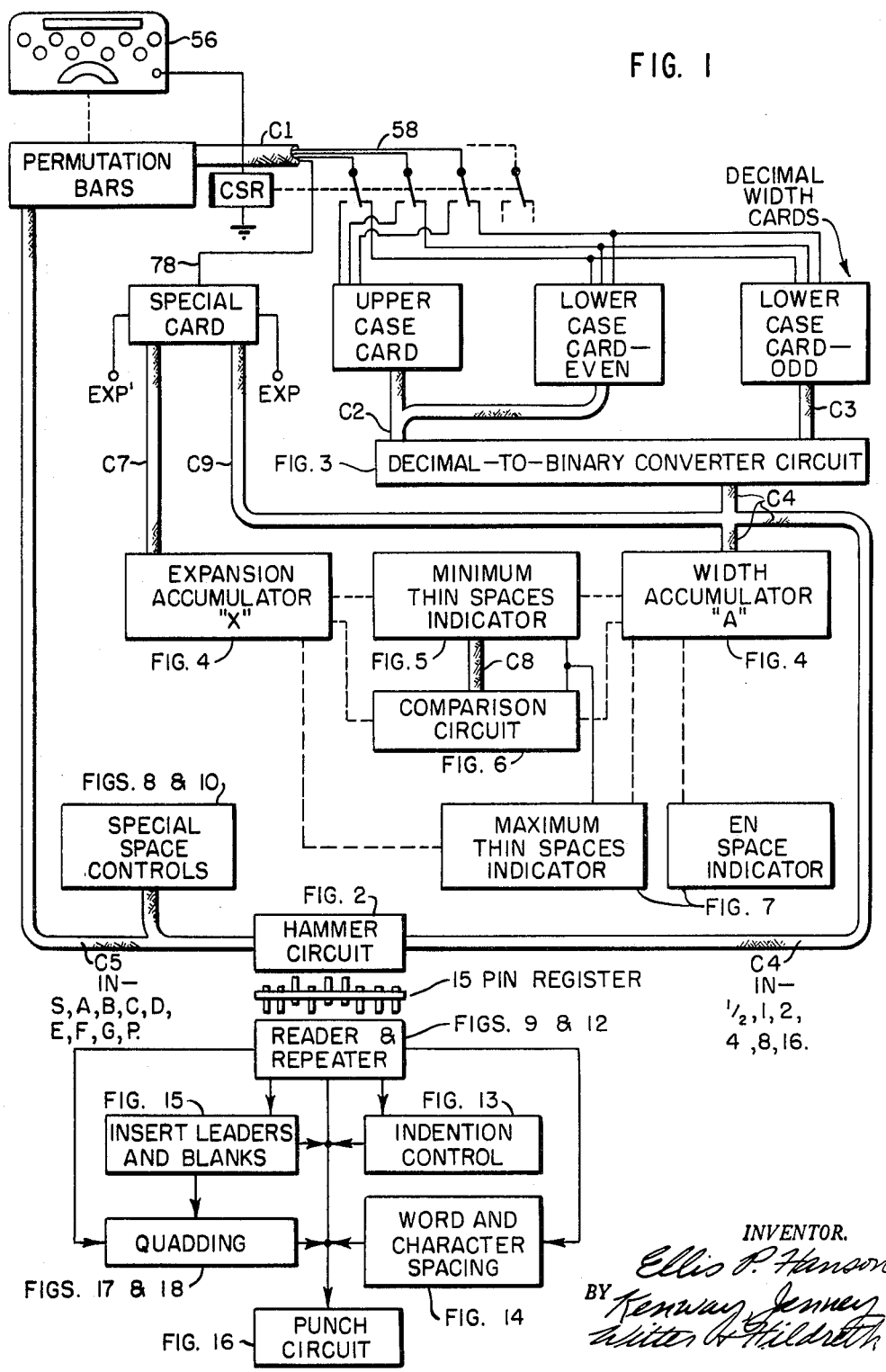
Figure 4:
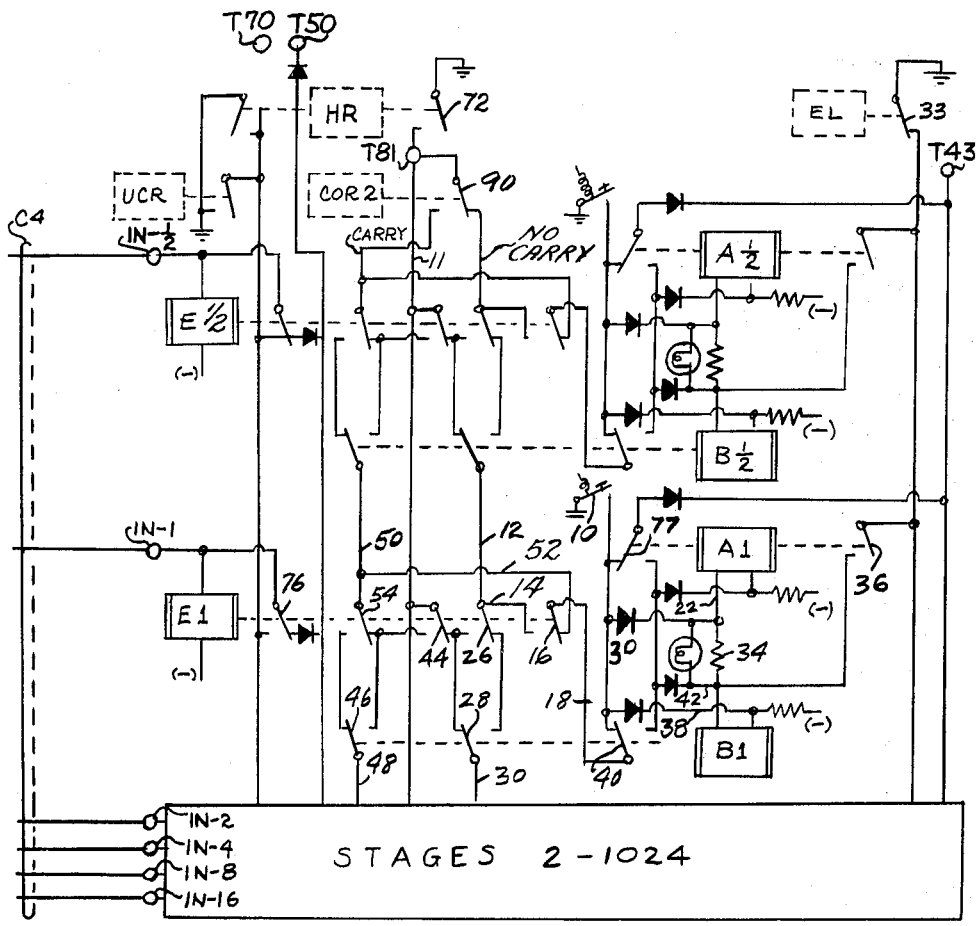

The circuits for energizing the individual hammer solenoids shown in FIG. 2 and designated as HSS, HSA, HSB, HSC, HSD . . . HS½, HS1 . . . HSP are described in greater detail below. Concurrently with the energizing of these solenoids information is entered in a pair of accumulators respectively designated a width accumulator "A" and a spaceband expansion accumulator "X" (FIG. 1). The width accumulator partially shown in FIG. 4 is a twelve-stage binary relay counter preset to a count value at the initiation of the typing of each line equal to the difference between its capacity and a selected justified line length. This accumulator advances from the preset value each time a character or spaceband is selected by the assigned width of the character or the minimum width of the spaceband, as the case may be. At the end of the typing of a line the difference between the capacity of this accumulator and the count reached equals the deficit, that is, the space which must be added to the line to justify it. The presetting means may take any desired form and they may comprise momentary switches such as 10 or any known equivalent means.

The spaceband expansion accumulator "X" is a counter constructed in a same manner as the width accumulator "A," the principle difference being that the stages of the width accumulator has the space values "½" to "1024" while those of the expansion accumulator have the values "¼" to "512." The expansion accumulator accumulates a total equal to the maximum available expansion which may be added to a line by the selected number of spacebands, assigning to each spaceband an "available" maximum expansion which as described under the heading "Justification Indicators," may be somewhat less than the actual maximum expansion of the matrix.

*Accumulator circuits*

The principles of operation of the accumulators may be understood by reference to FIG. 4 which illustrates the width accumulator. A cable C4 has six binary input leads connected with terminals IN-½ . . . IN-16, these leads being energized in combinations representing in binary form the value of each width to be consecutively added to the value previously accumulated. Each stage includes an input relay such as E1, a pair of relays such as A1 and B1, a "carry" lead and a "no carry" lead. When each width value is entered a lead 11 and either the "carry" or the "no carry" lead to each stage is energized according to whether or not the addition of the new width to the previously accumulated total involves a carry from the stage of next lower order.

Assuming that a direct input of value "1" is entered by grounding of the terminal IN-1 and that there is no carry from the preceding stage, the relay E1 is energized and locks on a terminal T70, and a "no carry" ground is connected via leads 12 and 14, make contacts 16 of the relay E1, a lead 18, break contacts of the relay B1 and leads 20 and 22 to energize the relay A1. The energized "no carry" lead into the stage is connected via make contacts 26 of the relay E1 and break contacts 28 of the relay B1 to the "no carry" lead 30 to the next stage. The relay A1 closes its contacts 26 having a ground connection supplied through break contacts 33 of a relay EL and a resistor 34. The relay B1 is not energized due to a shunt connection over a lead 38 which prevents its energization by ground through the contacts 36.

Removal of the ground applied to the lead 18 removes the shunt connection to the relay B1 and allows it to become energized through the contacts 36. Both relays now remain energized, the current through the resistor 34 being sufficient to hold the relay A1 in the energized condition but substantially less than the current which originally energized it.

The energized condition of the relays A1 and B1 indicates that the stage is now in the "1" position. With the stage in this position, assuming the same input conditions for the next width value to be added, the "no carry" ground which again reaches the lead 18 finds a connection through make contacts 40 of the relay B1 to shunt the relay A1. This relay quickly releases because the holding current through it is relatively small and the E.M.F. generated by the current flowing through it in the shunted condition is correspondingly small, and it opens its contacts 36 to open the previously-used energizing circuit of the relay B1. The latter relay remains energized, however, through a lead 42, until removal of the ground applied to the lead 18. While the latter ground connection continues, a connection is made from the "no carry" lead 12 into the stage, and through grounded make contacts 44 and make contacts 46 of the relay B1 to the "carry" lead 48 to the next stage.

It will be observed that the input conditions described above result in grounding of the lead 18. This same result and the above-described operation also follow if there is a carry to the stage but no direct input. In this case ground is applied to the lead 18 via the grounded "carry" lead 50 into the stage, a lead 52 and break contacts 16 of the relay E1. If the stage is in the "0" position the ground on the break contacts 44 is connected to the "no carry" lead 30 through the break contacts 28 of the relay B1. If the stage is in the "1" position the grounded "carry" lead 50 is connected to the "carry" lead 48 through break contacts 54 of the relay E1 and the make contacts 46 of the relay B1.

Simultaneous direct and carry inputs to a stage fail to change its position and result in grounding the "carry" lead 48. The lead 18 is not energized. If the stage is in the "0" position the ground "carry" connection is from the lead 50 through make contacts 54 and break contacts 48. If the stage is in the "1" position the ground on the blade of the contacts 44 is connected to the lead 48 through the make contacts 46.

Input sequence

The sequence of operations resulting from depression of a key is next described. The typewriter 56 (FIG. 1) is generally similar to non-justifying electrical typewriters now in wide use and has a platen carriage on which a copy of the characters is made so that the work may be visually checked by the operator. The preferred machine has forty-three typing keys. Each of these has a coded tripping bar which is moved when the corresponding key is struck. Coded notches on these bars push against a number of permutation bars of a conventional form which in turn close combinations of permutation bar contacts. These contacts in turn ground combinations of leads in a cable C5 leading to the hammer circuit (FIG. 2). As shown in FIG. 1, the codes on these leads eventually actuate the register pins S, A, B, C, D, E, F, G and P.

Each coded tripping bar for a character also actuates a "width" contact directly. Each such contact is connected to a unique wire such as 58 leading to transfer contacts of a case shift relay CSR energized by depressing the case shift key on the typewriter. These latter contacts are in turn connected to three sets of coded multiple-circuit cards, not here shown but fully described in the copending application of Higonnet and Moyroud Serial No. 741,209, filed June 9, 1958. A number of styles of type may be selected by the operator, each style including two fonts such as roman and bold face. In accordance with conventional linecasting practice, each matrix actually bears two characters, a character in one font which may be selected by dropping the matrix "on the rail" and a character in the other font which may be selected by dripping the matrix "off the rail." For each style a card group consisting of a pair of lower case cards and an upper case card is provided. The groups may be selected mechanically as described in the above application, or by any equivalent means. The cards are connected to cables C2 and C3 shown in FIG. 3. The function of the cards is to energize a single one of the wires on a single cable C2 or C3 each time a character key is strucks. Of the latter wires, each has a corresponding decimal width value which is the value for the selected character matrix in the selected style. An inspection of FIG. 3 will show that a total of 26 width values is provided.

Figure 3:
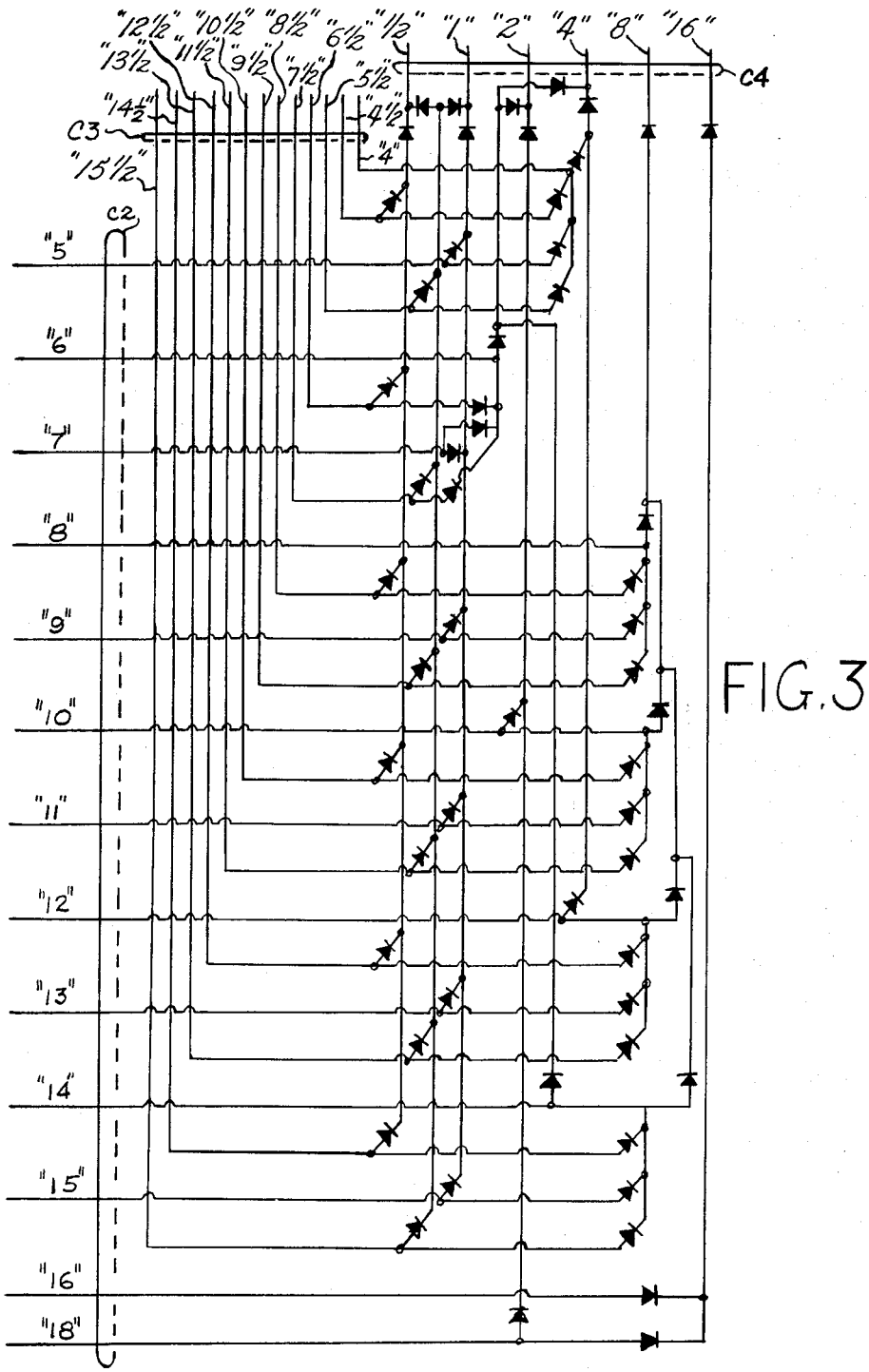

The circuit of FIG. 3 is a decimal-to-binary converter which makes connections to binary leads in a cable C4 representing the width value in binary form.

Inputs to the register and to the accumulators are also accomplished by operation of auxiliary pushbuttons adjacent the keyboard. These are further described below. The corresponding circuits by-pass the permutation bar circuits described above.

We now consider in detail the sequence of operations resulting from depression of a character key. Referring to FIG. 2, a fragmentary circuit diagram is shown for the code leads in the cable C5 which operate register pin positions D and E. The circuit for the other positions is of the same form and will be readily understood by one skilled in the art. Taking for example permutation bar contacts PBC–D, closure of these connects ground through break contacts of a keyboard locking relay KBL to a terminal IN–D and energizes a hammer solenoid HSD which depresses the corresponding pin in the register. Ground through a lead 60 energizes a relay UCR which closes make contacts to energize the typewriter escapement solenoid TESC.

When the pin is pushed in, the hammer solenoid is released by the following circuit. Closure of contacts 62 of the relay UCR connects ground to one side of a hammer relay HR but the latter relay is shunted by break contacts 64 of the solenoid HSD until the latter is operated. When the solenoid HSD has operated the shunt connection to the relay HR is opened and the latter becomes energized to signal completion of the register entry. It will be noted that in the average case where several pins are to be depressed, the relay HR is not energized until all pins have been depressed. The operated relay HR energizes the input carriage escapement and hammer return solenoids ICE and HRET and opens its break contacts 66 in the hammer solenoid energizing circuit. The relay UCR releases upon the opening of the closed PBC-contacts.

The now energized relay HR locks on its make contacts 68 and parallel break contacts of the solenoids TESC and ICE. When the latter solenoids have been energized the locking ground to the relay HR is removed and the latter is deenergized.

The relay UCR cannot be released to cause opening of its contacts 62 prematurely and thereby to produce failure of the relay HR to become energized. This is prevented by a holding circuit for the relay UCR from its contacts 70 through make-before-break contacts 68 of the relay HR and the above-mentioned parallel break contacts of the solenoids TESC and ICE.

Striking of a character key also closes its "width" contacts as previously stated and through the style cards and the decimal-to-binary converter circuit of FIG. 3 grounds a combination of the binary width input terminals connected to the cable C4 (FIG. 2). For purposes of description only the circuit for the terminal IN–1 is shown. The grounding of the terminal IN–1 energizes the relay UCR and this has the same effect on the sequence of operation as energization of the solenoid HSD already described. Grounding of the terminal IN–1 also causes energization of the hammer solenoid HS1. While this operation is being performed the width value is also entered in the width accumulator through other connections of the cable C4 previously described in connection with FIG. 4. As shown in FIG. 4, the relays E½ . . . E16 lock on parallel make contacts of the relays UCR and HR to prevent the transfer of contacts of the E-relays while the "carry" and "no carry" leads are grounded, which would produce false accumulator entries. Also, the entry to the accumulator is initiated by closure of contacts 72 of the relay HR which supply the ground connections to the operating circuits previously described.

It will be noted that these circuits insure that the accumulator entry will not be initiated until the relay HR is energized and the latter relay is not energized until both the hammer solenoid HS1 and the relay E1 have been operated. Prior to that time, either the contacts 74 of the solenoid HS1 (FIG. 2) or the contacts 76 of the relay E1 (FIG. 4) are closed and connect ground to the terminal T50. Means are also provided to insure that the relay HR is not deenergized until all accumulator entries have been completed. Referring to FIG. 4, a lead such as 18 is energized in each stage which is to change position. Contacts 40 of the relay such as B1 and parallel contacts such as 77 of the relay such as A1 connect this lead to a terminal T43 to lock the relay HR (FIG. 2) if either (a) the lead 18 is energized while the stage is in the "0" position and the relay A1 has not yet operated, or (b) the lead 18 is energized while the stage is in the "1" position and the relay A1 has not yet released.

Striking of the spacebar at the keyboard actuates a "width" contact which grounds a wire 78 (FIG. 1). This wire is connected to a special style card similar in general structure to the style cards previously described but having a binary rather than a decimal output. This card has seven binary output leads connected by a cable C7 to input terminals IN–¼ to IN–16 of the expansion accumulator "X." The card connects the wire 78 with those inputs which represent in binary form the value of the maximum available expansion which a spaceband is capable of adding in the style selected. The accumulator "X" begins with the value "0" when each line is typed. This card also has six binary output leads connected by a cable C9 to input terminals ½ to 16 of the width accumulator "A," and it connects the wire 78 with those inputs which represent in binary form the value of the minimum width which a spaceband has in the style selected.

Correction

Correction of any character after it is entered in the register and the width accumulator is readily accomplished if the error is deleted before the line is sent from the register to the tape. Referring to FIG. 2, this is automatically accomplished by depressing a key BACK SPACE. If this key is held down, the ensuing sequence for correction next described will be repeated character by character. In brief, the sequence begins with the back-spacing of the platen carriage of the typewriter and the input carriage. Then follows the sensing of the width pins in the register position then reached, the subtraction of the sensed value from the total in the width accumulator "A," the subtraction of a maximum available spaceband expansion value from the accumulator "X" if a spaceband code is sensed, and the retraction of all of the register pins in that position. As the input is erased a slash mark is typed through the erased character on the copy on the platen carriage.

In detail, referring to FIG. 2, there is shown a set of input carriage starting position contacts ICSP-1. These are closed for all positions of the input carriage except the first. The sequence starts with closure of the key BACK SPACE which connects ground through the contacts ICSP-1 and break contacts of the relay COR2 to energize the typewriter backspace magnet BSM which steps the platen and the input carriage back one step by the means commonly employed in electric typewriters, not shown.

A make contact 79 of the magnet BSM closes to energize relays COR1 and COR2 which both lock on a ground connection through break contacts 80 of the erase solenoid ERA and make contacts 82 of the relay COR1.

A make contact 84 of the relay COR1 connects ground through break contacts of the relay HR and of the magnet BSM to energize the correction sensing solenoid SENS. This solenoid actuates seven sensing contacts associated with the width pins ½, 1, 2, 4, 8 and 16 and the S pin which close if the corresponding pins are in the unactuated positions.

A make contact 86 of the magnet SENS connects ground through the closed sensing contacts associated with the width pins to the E-relays of the width accumulator "A" (FIG. 4). These connections, and others made directly to the stages "32" to "1024" as shown, cause the subtraction of the sensed width value from the width accumulator "A."

The contacts 86 also make connections to the expansion accumulator "X" input terminals IN-32 to IN-512, and to an input terminal EXP' to the special card which is connected to all of the input terminals IN-¼ to IN-16 in this accumulator except those energized upon entering a spaceband expansion value as previously described.

When the sensed register position does not represent a spaceband the S pin is not depressed and the "s" sensing contact closes. This grounds an input terminal EXP to the special card which is connected to all of the input terminals IN-¼ to IN-16 in the accumulator that are energized upon entering a spaceband expansion value. Accordingly, when the sensed register position is not a spaceband all input terminals to the expansion accumulator "X" are grounded.

The contacts 86 also connect ground to the relay UCR over a wire 88 to initiate a subtraction entry to the "A" and "X" accumulators. The theory of subtraction employed is that, given a counter of "$n$" stages and capacity "$c$," a binary value "$w$" may be subtracted by adding the value $(c-w)$ + (value of lowest order stage) to the previous total, which in every case causes the counter to overflow its capacity and count up to the value representing the previous total, less "$w$." The value $(c-w)$, of course, is simply the value of all stages not used in representing the value "$w$" to be subtracted.

For reasons previously given, the relay HR is not energized by closure of the contacts 62 of the now-energized relay UCR until all of the energized E-relays of both accumulators have operated. Energization of the relay HR closes its contacts 72 (FIG. 4) and the "carry" lead to the lowest-order stage of each accumulator is grounded through now-operated transfer contacts 90 of the relay COR2. This enters in each accumulator a value equal to that of its stage of lowest order, which is added to the value entered by the E-relays in each case. From the foregoing discussion it will be clear that the subtraction entry subtracts from the width accumulator the width of the character to be erased, if it is a character, or the minimum width of a spaceband, if it is a spaceband, and subtracts from the expansion accumulator the maximum available expansion value for a spaceband, if a spaceband is to be erased.

Transfer contacts 92 of the relay HR also energize the erase solenoid ERA through the now-closed contacts 84 of the relay COR1. The solenoid ERA is mechanically engaged with means to retract all depressed pins in the sensed position. At the same time the contacts 80 of the solenoid ERA open the locking circuit of the relay COR1 which is then deenergized. The relay COR2, which is also locked on the same circuit, remains locked on another circuit through its make contacts 94 and a make contact 96 of the relay HR. When the relay HR releases to signal completion of the subtraction entry, the relay COR2 releases and this completes the correction sequence.

Special code entries

As stated above, circuits associated with pushbuttons adjacent the keyboard permit the entry of special codes in the register. The following exemplary codes are entered in the latter:

(1) Spaceband—S, E, plus minimum spaceband width.
(2) Shift to upper rail—B, C, F, G, P.
(3) Shift to lower rail—B, C, D, F, G.
(4) Em space (when lower rail code was last entered)—B, C, E, 16 alternating with B, D, G, 16.
(5) Em space (when upper rail code was last entered)—B, E, G, 16.
(6) En space (when lower rail code was last entered)—B, D, E, F, P, 8.
(7) En space (when upper rail code was last entered)—B, C, D, E, G, 8.
(8) Insert leader or blank space—S, B, plus minimum spaceband width.
(9) Quad left—B, C, E, F, P.
(10) Quad right—B, C, D, E, F.
(11) Thin space—B.

The manner in which the code in case (8) is used to cause perforation of the tape depends, as hereinafter shown in the section entitled "Inserting Leaders," on the state of certain relays operated or not operated when the code is read. These relays operate according to whether the upper or the lower rail code was the last entered, and whether or not a composition leader relay CLR and composition insert blanks relay CIB are then energized. It is also noted that in certain of the above cases the parity code P appears. The circuit by which this parity code is used is described hereinafter under the heading, "Parity Checking."

Register-operated tape perforating circuits

Figure 11:
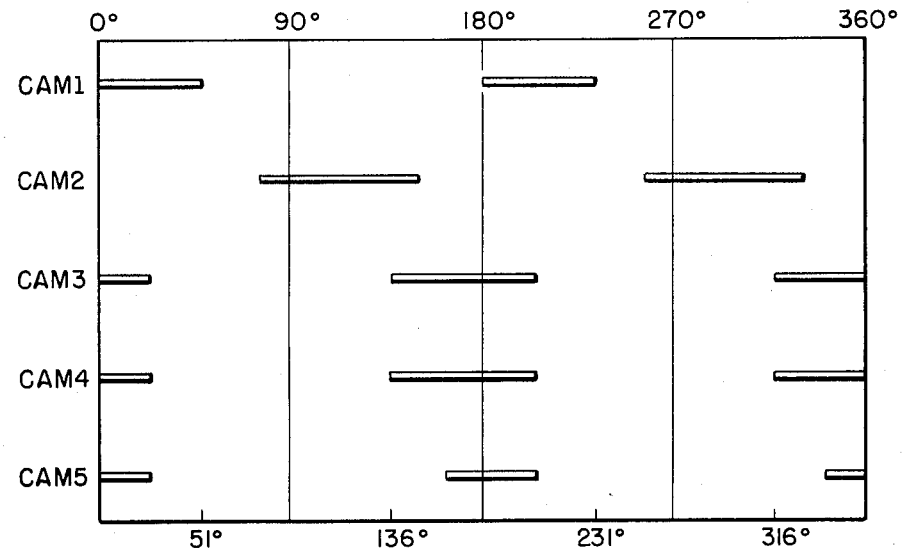
FIG. 11 is a timing diagram for certain cam-operated contacts associated with the sequencing controls.

Indications on display panels described below under the heading "Justification Indicators" show when a line is in the justification range. When it reaches a total length such that the deficit, i.e., the difference between the justified line length and the length added to the accumulator "A" by the character and minimum spaceband entries, is equal to or less than the value in the expansion accumulator "X," a light JPN (FIG. 6) will go on. Normally, a line is composed until this occurs. In some cases to be discussed, however, the composition of the line is terminated earlier. In any case, the line is terminated by depressing a key CARRIAGE RETURN which causes the entry in succession of two codes in the register, a "return" code S, F and an "elevate" code S, D. These codes are eventually used to punch codes F and D in the tape. The code F is used to return the carriage of a conventional page printer if one is used to transcribe the tape. The "elevate" code is used to deliver a line for casting in a linecasting machine. The entry of these codes in the register is described below. After the codes are entered, the input carriage is automatically returned to the starting position. Once it begins to return to the starting position the transcription process starts. First the sensing fingers on the reading carriage operate the sensing contacts for each pin in the first register position that is depressed. These contacts in turn cause energization of register repeating relays which hold the code sensed. These relays in turn transmit codes to the punch solenoids (FIG. 16) respectively connected to terminals *pb* . . . *pp*. After one position of the register is sensed, the reading carriage is escaped to the next position and the operation is repeated. The sequence is controlled by five continuously-rotating cam-operated contacts CAM1 . . ., CAM5, the timing diagram being shown in FIG. 11, contacts CAM1 . . ., CAM4 being shown in FIG. 9 and contacts CAM5 being shown in FIG. 12. After the last code in the register S, D is read, the reading carriage is returned to the starting position and transcription of the line is complete.

We next turn to a more detailed explanation of the transcription process initiated by depression of the key CARRIAGE RETURN (FIG. 9). This connects ground to energize an end-of-line relay EL through make contacts of the width accumulator relay A1024, make contracts of a "justification possible" relay JP2 (FIG. 6) energized as hereinafter described under the heading "Justification Indicators" to signify that the line is of sufficient length for justification, and break contacts of relays CLR, F1 and F3. Contacts 98 of the relay EL close to energize a relay F1, but the latter is shunted by a connection through make contacts 100 of the relay EL, its own break contacts and the terminal T43 (FIG. 2) grounded through parallel break contacts of the solenoids TESC and ICE. Ground through break contacts 102 of the relay F1 also reaches terminals IN–S and IN–F to enter the "return" code in the register. Completion of this entry, as will be recalled from the previous description, results in removal of the ground on the terminal T43. Then the relay F1 is energized.

A further result of operation of the relay EL is to remove a locking ground on all stages of the width and expansion accumulators "A" and "X" in the "1" positions by opening its contacts 33 (FIG. 4). This sets them both to zero, and prior to the typing of the next line a number of keys 104 are depressed to preset the width accumulator "A" to a value equal to its capacity, less any selected justified line length.

Referring now to FIG. 2, after the solenoids TESC and ICE have been energized for the S, F code entry and then released by opening of make contacts of the relay UCR, ground is reconnected to the terminal T43 and as shown in FIG. 9, this now shunts the relay EL through make contacts 106 of the relay F1. The relay F1 holds after release of the relay EL through its contacts 102 and break contacts 107 of a relay F3. After the relay EL releases, terminals IN–S and IN–D are grounded by a connection from the terminal T43 through the make contacts 106 of the relay F1, break contacts 108 of the relay F2 and break contacts 110 of the relay EL. This initiates entry of the "elevate" code S, D.

The release of the relay EL also connects ground through its break contacts 98 and make contacts 112 of the relay F1 to energize the relay F2, but the latter is shunted by the previously-mentioned terminal T43 ground connction through its break contacts 108. As in the case of the previous entry, after completion of the entry the ground is removed from the terminal T43 and the relay F2 loses the foregoing shunt connection and is energized and holds on its contacts 113 and break contacts 114 of a relay F4.

After the solenoids TESC and ICE have been energized and released for the entry S, D as above described, the ground connection to the terminal T43 reappears and energizes a relay F3 through make contacts 106 and 108 of the relays F1 and F2, respectively. The same circuit connects ground through input carriage starting position contacts ICSP–2, which are open only when the input carriage is in the starting position, to energize the input carriage return solenoid ICR SOL. By operation of this solenoid the input carriage then returns to its starting position.

It will be noted that energization of the relay F3 opens its contacts 107 in the holding circuit of the relay F1, but the latter holds on the contacts ICSP–2 and is finally released only when the input carriage reaches the starting position.

The make contacts 107 of the relay F3 connect ground to energize a transcription relay TR. However, the latter relay has a shunt circuit through make contacts 115 of the relay F3, its own break contacts 116, break contacts 118 of a relay RCC and the contacts CAM1. It also has a shunt circuit through the make contacts 115, its own break contacts 120 and the contacts CAM4. Therefore, the relay TR cannot operate until both of these cam contacts are simultaneously open, which insures that the reading carriage sensing solenoid RCS SOL is operated, as described below, before the reading carriage advance solenoid RCA SOL as also described below.

Once the relay TR is energized, the transcription process is initiated under the control of the above-mentioned cam contacts. First, ground through the contacts CAM2 and make contacts 122 of the relay TR energizes the reading carriage sensing solenoid RCS SOL, which actuates sensing contacts associated with all of the alphabetical pins in the first column of the register, and ground is also connected to each of these contacts. Thus register repeating relays S, A, B, . . ., G, P, are energized for those register positions in which the pins are found to be depressed. The same repeating relays are also shown in broken lines in FIG. 12. Ground through the contacts CAM3 and a wire 124 forms a locking circuit for the energized repeating relays.

Figure 12:
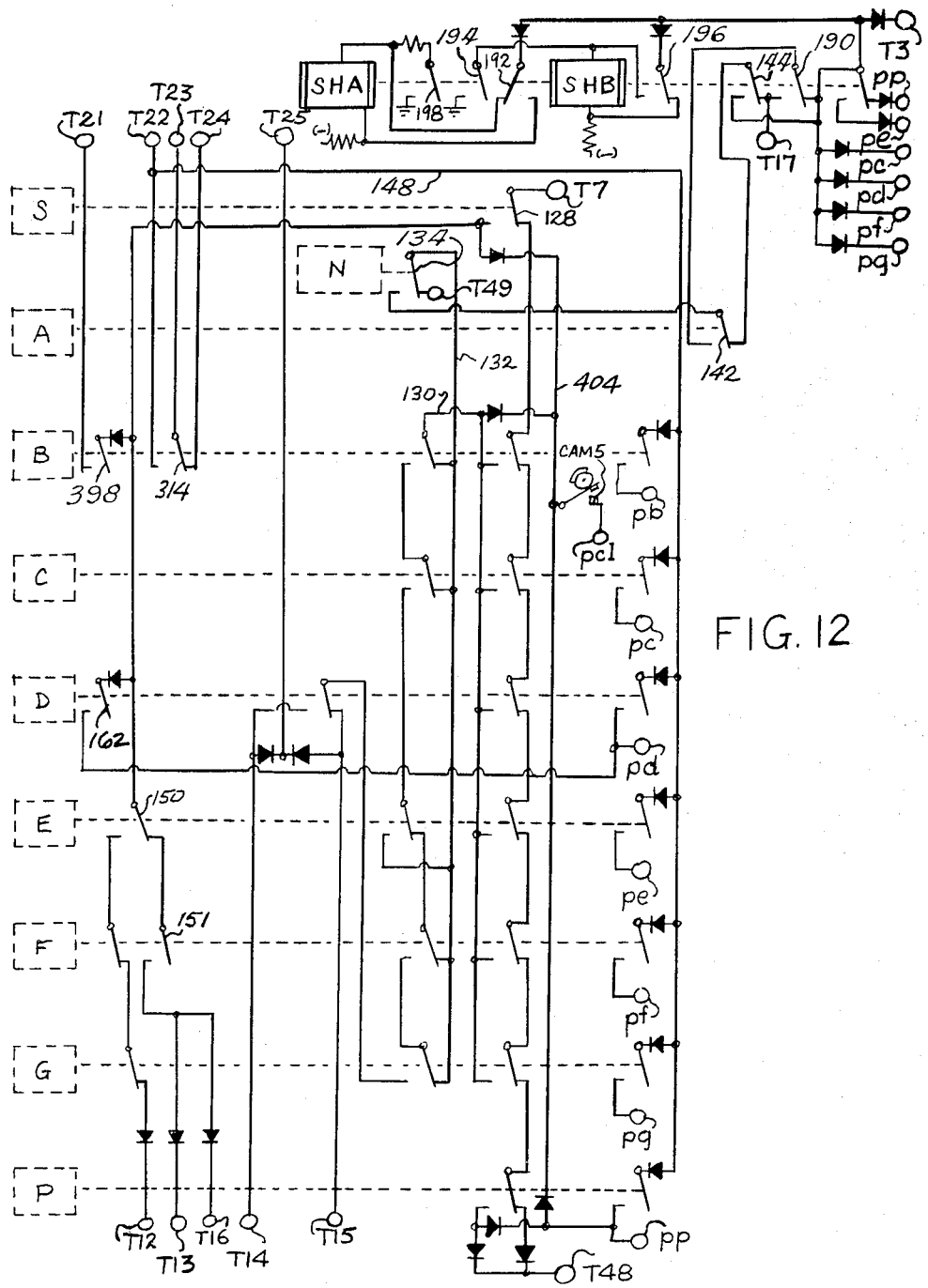

Ground is also connected through the contacts CAM4, the make contacts 120 of the relay TR and break contacts 126 of a "kill line" relay KL to a terminal T7 (FIG. 12). This terminal is connected through break contacts 128 of the relay S to a network of repeating relay contacts whereby, if any of the relays B, C, D, E, F or G is energized the ground goes to a wire 130. Referring to the above description, a code for a shift to either the upper or lower rail includes the combination B, C, F and G, without E. Except when these codes are detected, the ground connection goes to a wire 132 connected to contacts 134 of a relay N. The relay N is energized (FIG. 13) through an "OFF" contact of a switch 136, a terminal T26 (FIG. 18) and a brush 138 on a right quadding gang stepping switch 140 in its first position.

For the case, considered as a normal case, in which the sensed code is not a rail shift, the make contacts 134 of the relay N (FIG. 12) connect ground through break contacts 142 of the relay A and break contacts 144 of a relay SHB, a terminal T17 (FIG. 14), break contacts 146 of a relay SCS, a terminal T22 (FIG. 12) and a wire 148 to the common side of make contacts of the relays B to P. Those contacts which are closed connect ground to terminals *pb* to *pp* (FIG. 16) to energize the corresponding tape punch solenoids PB to PP. The punch solenoid PP does not normally correspond to any position on the tape since the latter has positions only for the six solenoids PB, PC, PD, PE, PF and PG. For a description of the solenoid PP see the heading below entitled, "Parity Checking." Since the foregoing circuit includes break contacts of the relay A, it is used for transcription of all lower case characters. The circuits for a case shift are described below under the heading entitled "Shifting the Case."

After the operation of the punch solenoids as described above, the reading carriage advance solenoid RCA SOL (FIG. 14) is energized to advance the reading carriage to the next register position by a ground connection through the contacts CAM1 (FIG. 9), the break contacts 118 of the relay RCC, the make contacts 116 of the relay TR, a terminal T4 (FIG. 13), break contacts of relays IR1 and IR2, a terminal T68 (FIG. 14) and break contacts 149 of a relay CSA.

Figure 15:
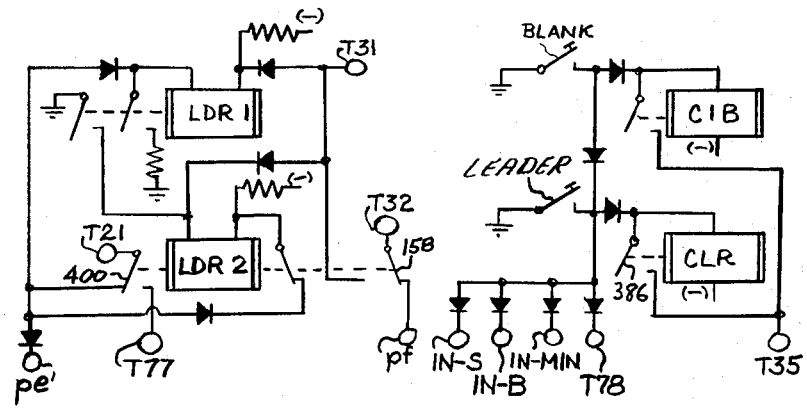

After the last character in the register has been read, the S,F code is sensed. If the line is neither a quad left line nor an indented line, the ground through the contacts CAM4 (FIG. 9) and the terminal T7 will energize the solenoid PF (FIG. 16) through a circuit including the make contacts 128 of the relay S (FIG. 12), break contacts 150 of the relay E, make contacts 151 of the relay F, a terminal T16 (FIG. 13), make contacts 152 of the relay N, a brush 153 on the switch 136, a terminal T28 (FIG. 17), break contacts 154 of a relay TLR, a brush 155 on a left quadding gang stepping switch 156 in its first position, break contacts 157 of the relay TLR, a terminal T32 (FIG. 15) and break contacts 158 of a relay LDR–2.

The next code read is S,D. In this case the ground through the contacts CAM4 (FIG. 9) and the make contacts 120 of the relay TR is connected to two circuits, of which the first is through the terminal T7 (FIG. 12), the make contacts 128 of the relay S, make contacts 162 of the relay D and the terminal *pd* to the punch solenoid PD. The other path (FIG. 9) is through series make contacts of the relays S and D, a break contact of the relay E, a break contact of a "register clear" relay RC and make contacts 164 of the relay F2 to energize the relay F4. The operated relay F4 opens its contacts 114 in the holding circuit of the relay F2, these same contacts now forming a holding circuit for the relay F4. Contacts 166 of the relay F4 also connect ground through make contacts 168 of the relay F3 to lock it.

When the next position in the register, having no code, is sensed, ground through the contacts CAM3 is connected through make contacts 170 of the relay F3 and break contacts 172 of the relay F2 to shunt the relay F4, and to lock the relay F3 over a wire 174 connected to its make contacts 168. When the contacts CAM3 open, the relay F3 is released and by opening its contacts 107 releases the relay TR. Break contacts 176 of the relay TR connect ground through reading carriage starting position contacts RCSP to energize the reading carriage return solenoid RCR SOL which returns the reading carriage to the starting position, the latter contacts remaining closed until the carriage reaches that position. The solenoid RCR SOL locks on these same contacts and is released when the starting position is reached.

Kill line

Depression of a key KILL LINE (FIG. 9), in place of depressing the key CARRIAGE RETURN as described above, connects ground from the break contacts 176 of the relay TR to energize the relay KL. Make contacts 178 of this relay connect ground to energize the relay EL, this ground being connected through the circuit previously described including make contacts of the relays A1024 and JP2 and break contacts of the relays F1 and F3. This same ground also reaches the relay EL through make contacts of the relay KL. A sequence similar to that described above then commences, but is modified by the fact that since the relay KL is now operated the ground connection from the contacts CAM4 which normally reaches the punch solenoids through the terminal T7 is disconnected from that terminal by the contacts 126 of the relay KL. Therefore, no punch solenoids operate for the given line. All register pins will be sensed and returned to the unactuated positions by suitable means fully described in said Patent No. 2,690,249.

Referring to the previous description, it will be recalled that when the final position in the register, having no code, is reached, a ground connection through the contacts CAM3 shunts the relay F4. This ground also shunts the relay KL by a connection through a wire 180 (FIG. 9), the break contacts 172 of the relay F2 and the make contacts 170 of the relay F3.

Clearing the register

When it is desired to insure that all 100 columns of pins in the register are retracted, without transferring any information therein to the tape, and regardless of the length of any line that may be recorded in the register, a key REGISTER CLEAR (FIG. 9) is closed. This energizes a register clear relay RC which holds on its make contacts 182 and break contacts 184 of the relay F4. The relay RC connects ground through its make contacts 186 to energize the relay KL. The ensuing sequence of operations is the same as that for the "kill line" case previously described, up to the sensing of the code S, D at the end of a line. Referring to the description above, it will be recalled that this code in a normal line to be transferred to the tape causes a ground connection from the contacts CAM4 through the make contacts 120 of the relay TR and contacts of the relays S and D to reach and energize the relay F4. However, in the case here considered in which the relay RC is energized, the foregoing energizing circuit for the relay F4 is broken by the contacts 188 of the relay RC. Since the relay F4 fails to be energized, the transcription process continues and the reading carriage continues to advance from position to position of the register until it reaches the final position. In this position, the reading carriage closes contacts RC SAFETY which connect ground through the contacts CAM3 and the contacts 164 of the relay F2 to energize the relay F4. The remainder of the sequence follows that previously described for a normal transcribed line. Operation of the relay F4 opens its break contacts 184 and releases the relay RC.

Shifting the case

In recording information in the register, the code A appears in combination with other selected alphabetical codes in a single column of the register to designate a capitalized character. The same code without the A is used to designate the same character in the lower case. In contrast to this, the tape perforations produced by these codes include separate tape positions for "shift" and "unshift" commands, and as previously stated there is no tape position corresponding to the code A. For example, the word "THe" is recorded in the register in only three columns of pins, the pins A in the first two columns being depressed. However, five successive sets of coded perforations are transcribed to the tape from these three register positions, first a "shift" code alone, then a code for the character "T" (being the same as that for a "t"), third, a code for the character "H" (being the same as the code for "h"), fourth, an "unshift" code alone, and fifth, a code for the character "e" (being the same as the code for "E").

The circuit for producing the foregoing results includes a pair of flip-flop relays SHA and SHB (FIG. 12) and the contacts 142 of the relay A. To explain this circuit the foregoing example will be considered.

Referring to the foregoing description of the transcription of a line, it will be recalled that after the sensing of each lower case character corresponding punch solenoids are energized through a circuit including the contacts CAM4 (FIG. 9), a terminal T7 (FIG. 12), a circuit passing through the make contacts 134 of the relay N, the contacts 142 of the relay A, the terminal T17 (FIG. 14), the break contacts 146 of the relay SCS to the terminal T22 (FIG. 12) leading to the common side of register repeating relay contacts connected to the punch solenoids. In the presently assumed case, when the code corresponding to the "T" is sensed in the register, the relay A is energized. The punch circuit just described is then interrupted by the contacts 142 of the relay A, and the ground connection from the contacts CAM4 passes through break contacts 190 of the relay SHB to energize a relay SHA through break contacts 192 of the relay SHB. The same ground connection through the contacts 190 reaches the punch solenoids to punch the code C, D, F, G, P. The relay SHA is energized at the first appearance of the foregoing ground connection, and closes its contacts 194 to energize the relay SHB, but the latter relay is shunted by the same ground connection passing through its break contacts 196. While the relay SHA locks on its make contacts 198, the relay SHB is not energized until its shunt circuit is removed upon the disappearance of the foregoing ground connection. When both of the relays SHA and SHB are energized, the flip-flop circuits is described as being in its "1" condition.

The ground connection through the contacts 190 of the relay SHB, previously mentioned, also passes through a terminal T3 (FIG. 9) to energize the relay RCC. This relay opens its contacts 118 in the previously-described circuit which normally connects the contacts CAM1 to the reading carriage advance solenoid RCA SOL through the terminal T4 (FIG. 14) and break contacts 149 of the relay CSA. At the termination of this ground connection, the relay RCC is released. Since the solenoid RCA SOL is not energized by this ground connection, the same sequence will be repeated by sensing the same register code again. However, in this case the ground connection through the contacts CAM4 (FIG. 9), passing through the make contacts 142 of the relay A (FIG. 12), reaches the terminal T17 through make contacts 190 of the relay SHB. This terminal (FIG. 14) is connected through the break contacts 146 of the relay SCS and the terminal T22 (FIG. 12) to the punch solenoids as previously described. This will cause the punching of the same code in the tape which appears in the register, without the code A. Since the relay RCC (FIG. 9) is not operated in at this time, the solenoid RCA SOL is operated in the normal manner and the next code position in the register is sensed. Since the code for the "H" also includes the code "A," the tape punch ground connection through the terminal T17 (FIG. 12) is completed through the make contacts of the relay A and the make contacts 190 of the relay SHB. Again, the tape is perforated with the same code appearing in the register, without the code A. Again, the solenoid RCA SOL is energized to advance the reading carriage to the third character position.

When the register code for the character "e" is sensed, the relay A (FIG. 12) is not energized and the ground connection from the contacts CAM4 (FIG. 9), which is normally used to energize punch solenoids, passes through the break contacts 142 of the relay A and make contacts 144 of the relay SHB to shunt the relay SHA through the make contacts 192 of the relay SHB. The same ground connection through the contacts 144 is connected to the punch solenoids to punch the "unshift" code C, D, E, F, G. This ground connection immediately opens the contacts 194 of the relay SHA in the holding circuit of the relay SHB, but the latter remains energized until the termination of the ground connection by a circuit through its make contacts 196. When the relay SHB releases, the flip-flop circuit is restored to its original, or "0," condition. Since the same ground connection which shunts the relay SHA also passes through the terminal T3 (FIG. 9) to energize the relay coil RCC, the solenoid RCA SOL again fails to advance the reading carriage and the code for the character "e" is again sensed. At this time, the flip-flop circuit is in the normal or "0" condition for transcribing a lower case character as previously described in detail.

In general, therefore, it may be stated that whenever the position of the relay A does not correspond to that of the relay SHB, the register position in which the condition occurs is sensed twice, the first sensing operation being used to interrupt operation of the reading carriage advance solenoid and to put in the tape a "shift" or "unshift" code, and the second sensing operation being used to perforate the character code.

*Justification indicators*

Figure 7:
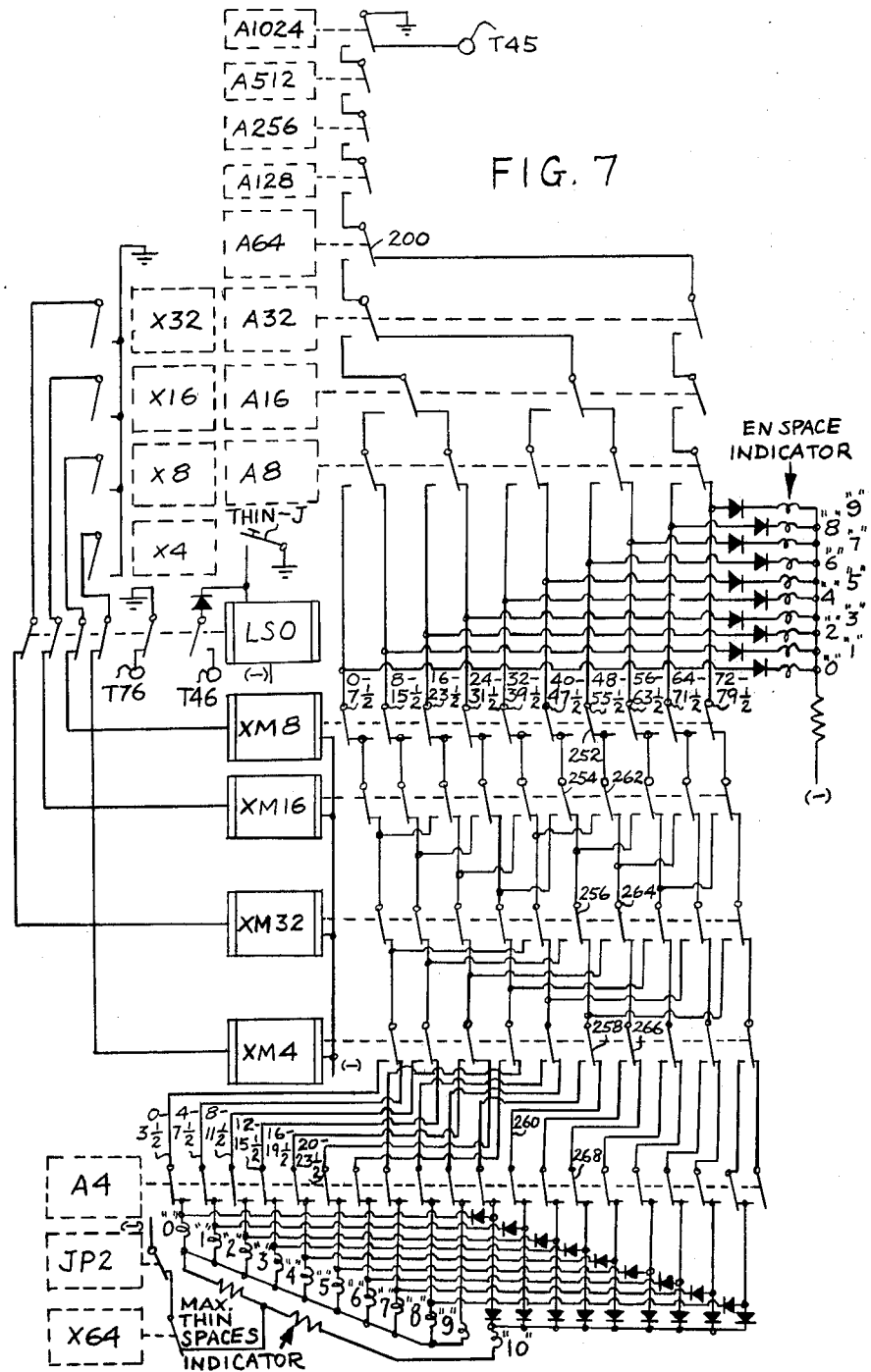

Having described above the circuits normally used for recording characters in the register and transcribing them to the tape, we turn next to a description of the circuits which inform the operator when and under what conditions a selected line is of sufficient length to be properly justified by the spacebands. Referring first to FIG. 7, there is shown an "en space indicator" having lights labeled "0" to "9" connected with contacts of the A-relays in the width accumulator. It will be recalled that this accumulator is preset with a value at the beginning of each line equal to its capacity, less the justified line length. Therefore, the deficit, that is, the difference between the justified line length and the total of the selected character and minimum spaceband widths, is represented by a binary value obtained by equating to "1" each stage of the accumulator in the "0" position after any entry.

The ground for the lights passes through series make contacts of the higher order stages of the width accumulator and no connection reaches the lights until the deficit is reduced to the value "79½", at which point break contacts 200 of the relay A64 connect ground to a light "9" through make contacts of the relays A32 and A16 and break contacts of the relay A8. This light will remain on until the deficit is reduced below the value "72."

When the deficit is reduced to the value "71½" the light "8" is grounded and remains on until the deficit is reduced below the value "64." Circuits may be similarly traced through all of the lights to show that they indicate the whole number of en spaces in the deficit, where an en space has the value "8."

Figure 6:
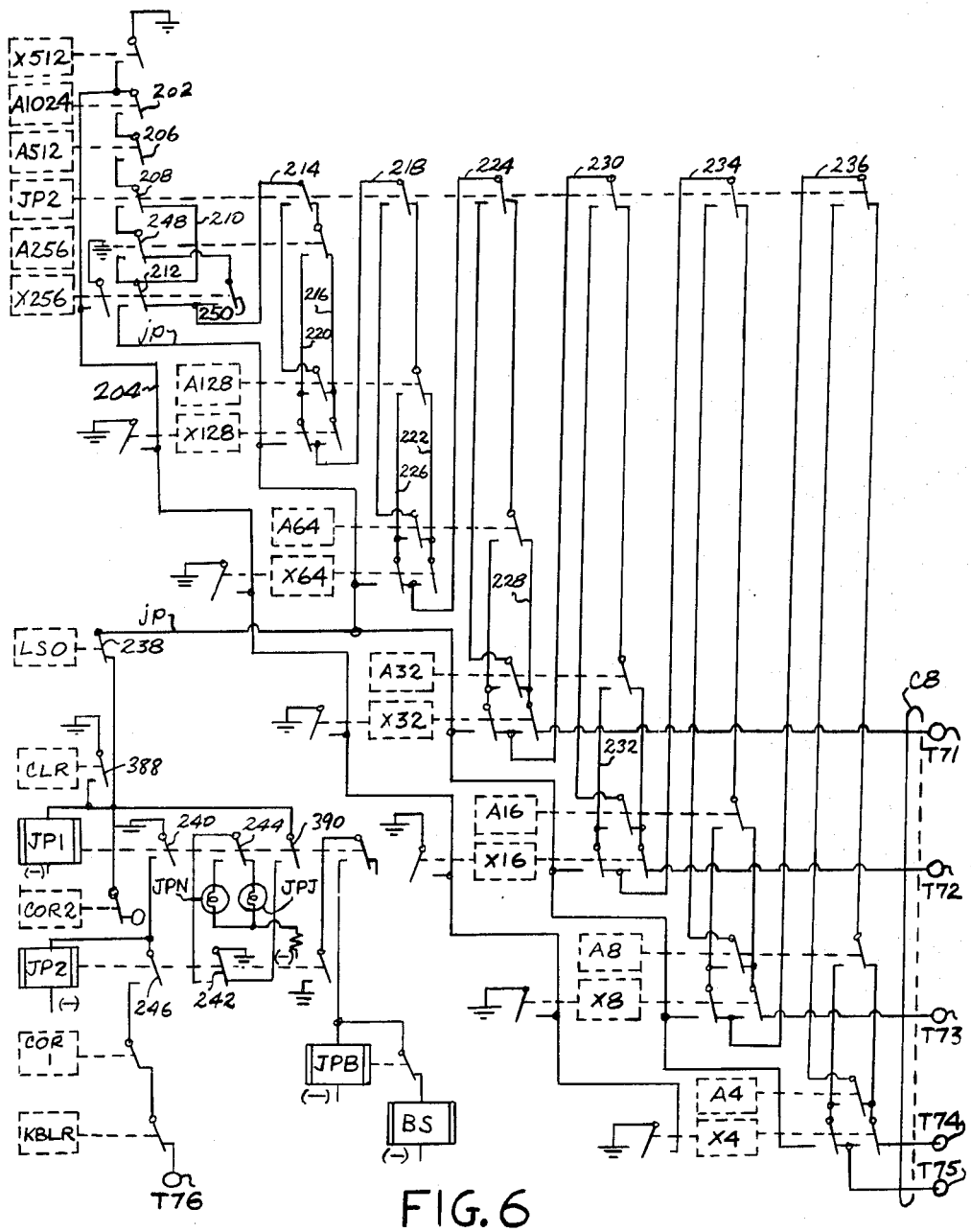

Referring next to FIG. 6, there is shown a comparison circuit having contacts of the A-relays in the width accumulator and of the A-relays in the spaceband expansion accumulator (designated for convenience by the letter "X"). It will be recalled that the value in the latter equals the maximum available expansion which the selected number of spacebands may add to the line. In general, a line can be justified by spacebands inserted alone between the words if the value in the expansion accumulator is equal to or greater than the deficit in the width accumulator. However, provision for justification of shorter lines is made by circuits which permit the insertion, with each spaceband or between the characters of a word or words, of fixed spaces which may be en spaces of value "8" or thin spaces of value "4," these values being selected for convenience and indicating only typical values that may be assigned. The comparison circuit is used to ascertain the moment when a line can be justified if en spaces are inserted with each spaceband, and the moment when the insertion of en spaces in this way is no longer necessary to accomplish justification. An understanding of FIG. 6 may be gained by considering a simple example in which it is assumed that a character of width "64" and a spaceband with an expansion of "32" are alternately selected at the keyboard.

The controls for indication are effected by a ground connection through make contacts 202 of the relay A1024. Since ground does not reach these contacts until at least one of the X-relays is energized to ground a lead 204, it follows that no possibility of justification exists until at least one spaceband has been selected. Also, this ground connection must pass through the contacts 202 and make contact 206 of the relay A512 to reach the control circuit, which means that no possibility of justification exists until the deficit is reduced to "511½." At this point ground is connected through break contacts 208 of a relay JP2 to a lead 210.

Suppose in the given example that a justified line length of "900" units has been selected. In that case the lead 210 is first grounded when seven characters of value "64" have been selected, having an accumulated length of "448" and leaving a deficit of "452." Before selection of the next following spaceband, six spacebands will have been selected having a total expansion capability of "192." Therefore justification using spacebands alone is not possible at this point in the composition.

The relays A256, A128, A64 and A4 are released and the relays X128 and X64 are energized. The ground on the lead 210 therefore passes through break contacts 212 of the relay X256 to a lead 214. It will be seen, therefore, that the lead 214 is grounded because the relay X256 is not energized, but a lead jp would be grounded if the relay X256 were energized. The lead jp, as shown below, is grounded to signify "justification possible." Hence, it may be seen that this portion of the circuit effectively accords to the relay X256 a double value "512," since the highest deficit that may exist with the wire 210 grounded is "511½" and justification would be possible if the accumulated expansion were "512."

The ground through the wire 214 is connected through break contacts of the relay JP2 and break contacts of the relay A256 to a wire 216, and from this wire through make contacts of the relay X128 to a wire 218. This portion of the circuit, therefore, performs a comparison according to the relay X128 a double value of "256," since the highest deficit that may exist if a wire 220 were grounded for any of the possible relay positions would be "255½" and justification would be possible if the accumulated expansion were "256" as signified by connection of this wire through make contacts of the relay X128 to the lead jp.

The ground through the wire 218 is connected through break contacts of the relay JP2 and break contacts of the relay A128 to a wire 222, and from this wire through make contacts of the relay X64 to a wire 224. This circuit, being identical in form to that just described, performs a comparison according to the relay X64 a double value "128." In this case, if the wire 226 is grounded the relay A128 must be energized, and either (a) the deficit is in the range "0" to "127½" with the relay X128 not energized, or (b) it is in the range "256" to "383½" (the relay A256 being released) with the relay X128 energized. In case (a) justification would be possible if the accumulated expansion were "128" as signified by operation of the relay X64. In case (b) justification would be possible if the accumulated expansion were "384" as signified by operation of the relay X64 as well as the relay X128.

The ground through the wire 224 is connected through break contacts of the relay JP2 and break contacts of the relay A64 to a wire 228, and since the relay X32 is not energized the ground connection reaches a terminal T71 in a cable C8 (hereinafter described) and no connection to the lead jp is possible.

The next spaceband is then entered to increase the accumulated expansion from "192" to "224." The relays X128, X64 and X32 are now energized. This now connects the ground on the lead 228 through make contacts of the relay X32 to a wire 230. The ground on the wire 230 is connected through break contacts of the relay JP2 and make contacts of the relay A32 to a wire 232, and through break contacts of the relay X16 to a lead 234. This ground is in turn connected through break contacts of the relay JP2, make contacts of the relay A16, break contacts of the relay X8, a wire 236, make contacts of the relay A8 and break contacts of the relay X4 to a terminal T75. Justification is therefore not possible in this step.

The next character is then entered to decrease the deficit from "452" to "388." The relays A256, A128 and A4 are now released, the other A-relays being all energized. The lead jp will now be grounded by a circuit through the wire 210, the break contacts 212 of the relay X256, the wire 214, break contacts of the relay JP2, break contacts of the relay A256, the wire 216, make contacts of the relay X128, the wire 218, break contacts of the relay JP2, break contacts of the relay A128, the wire 222, make contacts of the relay X64, the wire 224, break contacts of the relay JP2, make contacts of the relay A64 and make contacts of the relay X32. It will be seen that this signifies that justification is possible if the expansion capabilities of the seven spacebands entered are assumed to be "448" or twice the available capabilities, since the deficit is now "388," or less than this value.

The ground on the lead jp is connected through break contacts 238 of a relay LSO to energize a relay JP1. This relay closes its contacts 240 to energize the relay JP2. The relay JP2 locks on a ground through its contacts 246, break contacts of the relays COR1 and KBLR, a terminal T76 (FIG. 7) and break contacts of the relay LSO. Ground is now connected through make contacts 242 of the relay JP2 and make contacts 244 of the relay JP1 to illuminate a light JPN. Make contacts of the relays JP1 and JP2 (FIG. 6) also connect ground to energize a slow-acting relay JPB and a signal bell solenoid BS. As soon as the relay JPB is operated it breaks the circuit to the solenoid BS.

The operation of the relay JP2 as above described removes the ground on the lead jp in by its transfer contacts in the comparison circuit, releases the relay JP1 and turns on a light JPJ in place of the light JPN. The line is now described as being in the "JPJ" range. It will be seen that these contacts have the effect of reestablishing a comparison between the deficit and the accumulated expansion, now according to the X-relays their actual values rather than double values. Thus the ground is now connected through the make contacts 208 of the relay JP2, through break contacts 248 of the relay A256 to contacts 250 of the relay X256, now open. The illumination of the light JPJ indicates that the line may be justified by means described below which permit an addition of en spaces with the spacebands between words. If it is desired to add more characters to the line to eliminate the need for the extra spaces, composition is continued. By an analysis of the circuit similar to that described above, it will be seen that the lead jp will not be grounded until there are ten characters and nine spacebands recorded, at which point the deficit is "260" and the accumulated expansion is "288." At this point the relay JP1 is again energized to extinguish the light JPJ, turn on the light JPN and energize the signal bell circuit. The line is now described as being in the "JPN range."

If the operator "oversets" the line by then reducing the deficit to zero the keyboard is locked by operation of the locking solenoid KBL SOL (FIG. 2). The circuit for this purpose is fully described in the copending application of Higonnet and Moyroud Serial No. 531,023, filed August 29, 1955.

A further analysis of the circuit of FIG. 6 will show that the presence of ground on certain wires indicates the presence of an "unjustifiable deficit" within a fixed range of values. For example, below the JPJ range, the wire 214 represents the range "0" to "511½," the wire 216 represents the range "0" to "511½" and the wire 220 represents the range "0" to "255½." The wire 218 represents the range "0" to "255½," the wire 222 the range "0" to "255½," the wire 226 the range "0" to "127½," and the wire 224 the range "0" to "127½." Similarly, within the JPJ range the wire 214 represents the range "0" to "255½," the wire 216 the range "0" to "255½," the wire 220 the range "0" to "127½," and so on. From these observations we may derive the following table of "unjustifiable deficits" represented by grounds on the terminals of the cable C8:

TABLE 1

| Terminal | Below JPJ | Within JPJ |
|----------|-----------|------------|
| T71 | 0–127½ | 0–63½ |
| T72 | 0–63½ | 0–31½ |
| T73 | 0–31½ | 0–15½ |
| T74 | 0–15½ | 0–7½ |
| T75 | 0–7½ | 0–3½ |

Figure 5:
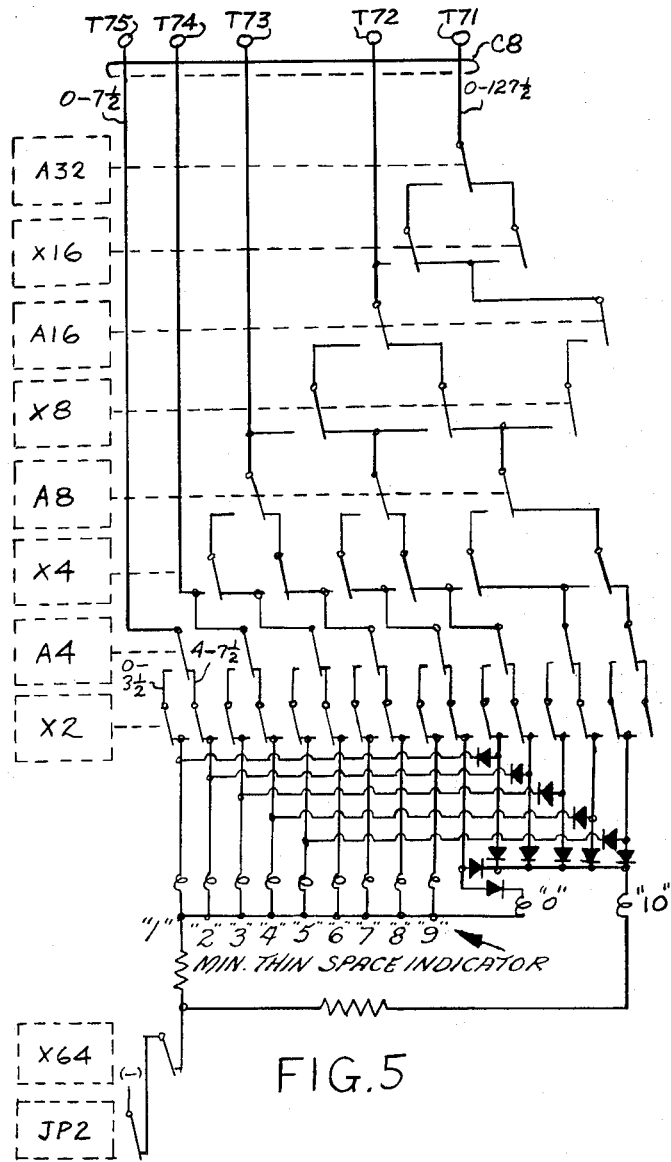

This cable is connected to the "minimum thin" indicating circuit of FIG. 5. This circuit indicates by means of a "10" light and unit lights "0" to "9" the minimum number of thin spaces of value "4" that could be added to the accumulated line length to bring it within the JPJ range. This number "n" is expressed mathematically by the minimum value $n$ such that $4n > D - 2X$, where D is the deficit and X is the available spaceband expansion. Taking for example the terminal T75, the value range of the "unjustifiable deficit" below the JPJ range is shown on the drawing. The associated break contacts of the relay A4 are connected to the "2" light if the relay X2 is not energized to indicate that n equals "2," that is, two thin spaces having a total value "8" would bring the line within the JPJ range, and if the relay X2 is energized the "1" light is grounded to indicate that n equals "1," that is, one thin space would bring the line within the JPJ range. If the relay A4 were energized the "1" light would be lighted if the relay X2 is not energized. It will be seen that all of the other lights are operated by a similar principle.

The energizing circuit for the lights in FIG. 5 is connected through break contacts of the relays JP2 and X64, which insures that no lights go on unless the line is below the JPJ range and the accumulated expansion does not exceed "64."

Referring next to FIG. 7, there is shown a "maximum thin spaces" indicator light "10" and unit lights "0" to "9." These lights are also grounded through break contacts of the relays JP2 and X64 and are therefore lighted only when the line is below the JPJ range and the accumulated spaceband expansion does not exceed "64." These lights normally indicate the maximum number of thin spaces that could be inserted in the line without causing it to reach the JPN range. Mathematically, they express the maximum value $m$ such that $4m < D - X$.

Relay XM8, XM16, XM32 and XM4 are respectively operated when corresponding expansion accumulator relays X8, X16, X32 and X4 are energized, through circuits including break contacts of a relay LS0. Contacts of these relays are conected to the "en space indicators" circuit described above, the possible values of the deficit for a ground on each of the connections being indicated on the drawing. The circuits lead to contacts of the relay A4 and grounds on the wires leading to these contacts normally represent ranges of possible deficit values which are in excess of the accumulated spaceband expansion. These ranges are in turn further defined by the contacts of the relay A4. Each of the contacts of the relay A4 leads to one or more lights indicating the maximum multiple of "4" units that could be added to the line without exceeding the indicated ranges.

If a key THIN-J is depressed the energizing circuits for the XM-relays are interrupted. The contacts of these relays now change the connections to the lights to represent the deficit, expressed in multiples of the value "4."

For example, suppose that before depression of the key THIN-J the deficit is "48" and only the relay X8 is energized. Ground is then connected through make contacts 252 of the relay XM8, break contacts 254 of the relay XM16, break contacts 256 of the relay XM32, and break contacts 258 of the relay XM4 to a wire 260 which indicates that the part of the deficit which is in excess of the accumulated expansion is in the range "44" to "47½." Since the relay A4 is assumed in this example to be energized, the ground connection is made to a wire which indicates the lower range "40" to "43½." This wire is connected to the "10" light to indicate that no more than ten thin spaces of value "4" could be added to the line without causing it to enter the JPN range.

If the key THIN-J is depressed the relay LS0 is energized and releases all of the energized XM relays, and the ground connection now passes through the break contacts 252 of the relay XM8, break contacts 262 of the relay XM16, break contacts 264 of the relay XM32, break contacts of the relay XM4 and make contacts 268 of the relay A4 to the lights "10" and "2." This indicates that a maximum of "12" thin spaces could be added to the line without causing it to exceed the justified length.

*Spaceband transcription*

From the foregoing description it will be evident that the operator may depress the key CARRIAGE RETURN when a line is in the JPJ range or when it is in the JPN range. If the line is in the latter range, upon the sensing of a register code S, E only the spaceband code E is transcribed to the tape punch solenoids, for it is evident that the line may be justified by the spacebands alone. Referring to the above description of the transcription sequence, the contacts CAM4 (FIG. 9) connect ground to the terminal T7 (FIG. 12), and the ground is connected through the make contacts 128 of the relay S, the make contacts 150 of the relay E, break contacts of the relays F and G, a terminal T12 (FIG. 14) and break contacts of the relay JSR to a terminal *pe* to punch the code E.

If the line is in the JPJ range when the key CARRIAGE RETURN is closed, the relay JSR is energized by a ground connection (FIG. 9) through the same circuit which energizes the relay EL, a terminal T30 (FIG. 14) and break contacts of the relays JP1 and LS0. The relay JSR locks on a ground connection through a terminal T19 (FIG. 9) and the break contacts 166 of the relay F4. The transcription of the line initiated by energization of the relay EL proceeds in the normal manner described above, until the code S, E is sensed. A ground connection through the contacts CAM4 (FIG. 9) is then made to the terminal T7 (FIG. 12), through the circuit including make contacts of the relays S and E previously described, to the terminal T12 (FIG. 14). This ground is now connected through the make contacts 282 of the relay JSR to a flip-flop circuit including the relays CSA and CSB which operates in a manner similar to the flip-flop circuit of FIG. 12 involving the relays SHA and SHB. This ground connection first finds a path through break contacts 284 of the relay CSB to energize the relay CSA. The latter relay opens its contacts 149 in the circuit for energizing the reading carriage advance solenoid RCA SOL, previously described in connection with normal transcription. The ground on the terminal T12 is also connected through break contacts 286 of the relay CSB, a terminal T58 (FIG. 18) and break contacts of relays TLR and TRS to punch solenoid terminals *pb, pd, pe, pf* and *pp*, to punch the en space code B, D, E, F, P in the tape. At the end of the foregoing ground connection through the contacts CAM4, the relay CSB is energized by the elimination of its shunt connection through its break contacts 288. The flip-flop is now in its "1" condition.

Since the reading carriage does not advance after the foregoing operation, the same register code S, E is sensed a second time. The next ground connection through the contacts CAM4 which reaches the terminal T12 (FIG. 14), through the circuit described above, shunts the relay CSA through the make contacts 284 of the relay CSB and break contacts 290 of a relay CA. The ground connection to the terminal T12 also finds a circuit through the make contacts 286 of the relay CSB to the punch terminal *pe* to punch the spaceband code E. At the termination of this ground connection the relay CSB releases because ground has been removed from its holding circuits through its contacts 288 and through contacts 292 of the relay CSA which has been released.

When the relay F4 (FIG. 9) is energized in the transcription sequence, it opens its contacts 166 in the holding circuit for the relay JSR previously described, and the latter relay is released.

It will be recognized from the above description that if a line is terminated when it is in the JPJ range, an en space code is sent to the tape followed by a spaceband code. It will also be recognized from the earlier description of the comparison circuit (FIG. 6) that the JPJ range is indicated to the operator as that range in which the line can be justified if spacebands of double the maximum "available" value are inserted between the words. In conventional linecasting machines suitable for use in conjunction with a tape produced by the present invention, it is frequently found that the spacebands each have a maximum expansion in excess of the width value "8," which is the en space value. In accommodating the tape perforating machine according to this invention to such cases, it is therefore arranged that the expansion value entered in the expansion accumulator "X" each time the spacebar is depressed is not the actual maximum expansion of the spaceband, but rather a lesser value determined by averaging the actual maximum expansion with the value of an en space in such a manner that termination of a line at any point in the JPJ range will permit justification by insertion of en spaces with the spacebands.

For example, if the actual maximum expansion of a spaceband in a particular linecasting machine has the value "10," the maximum "available" expansion which will be entered in the expansion accumulator "X" each time the spacebar is depressed may be assigned the value "9." Thus, if a line is terminated when it is barely within the JPJ range, the comparison circuit will have made its computation based upon the assumption that a space double the assigned maximum expansion value, or "18," may be inserted between the words. In transcription, the codes for an en space and a spaceband are perforated in the tape. The given linecasting machine will be able to justify such a line because, in addition to inserting an en space, it will insert a spaceband having an actual maximum expansion capability of "10." Using this actual maximum expansion capability, the linecasting machine will insert a total expansion of "18." If a line is in the JPJ range but very close to the JPN range, en spaces are transcribed with all spacebands, but the total of such en spaces in the line will not exceed the deficit.

*Shifting the rail*

When the operator desires to shift the rail during composition to bring into operative position the alternate character on one or more matrices to be selected, a pushbutton RAIL SHIFT (FIG. 10) is first depressed. This is mechanically interlocked with a pushbutton RAIL UNSHIFT. The transcription of characters subsequently selected will then be in the upper rail position. If the pushbutton RAIL SHIFT is left in the depressed position when a line is terminated, the transcription of the next line will also proceed in the upper rail position. Similarly, transcription in the lower rail position continues as long as the pushbutton RAIL UNSHIFT is in the depressed position. Since conventional linecasting machines suitable for use in conjunction with this invention normally automatically return to the lower rail position upon the completion of each line, automatic provision is made in the machine herein described to send a "rail shift" code to the tape at the beginning of the next line after any line that is terminated with the pushbutton RAIL SHIFT in the depressed position.

Figure 10:
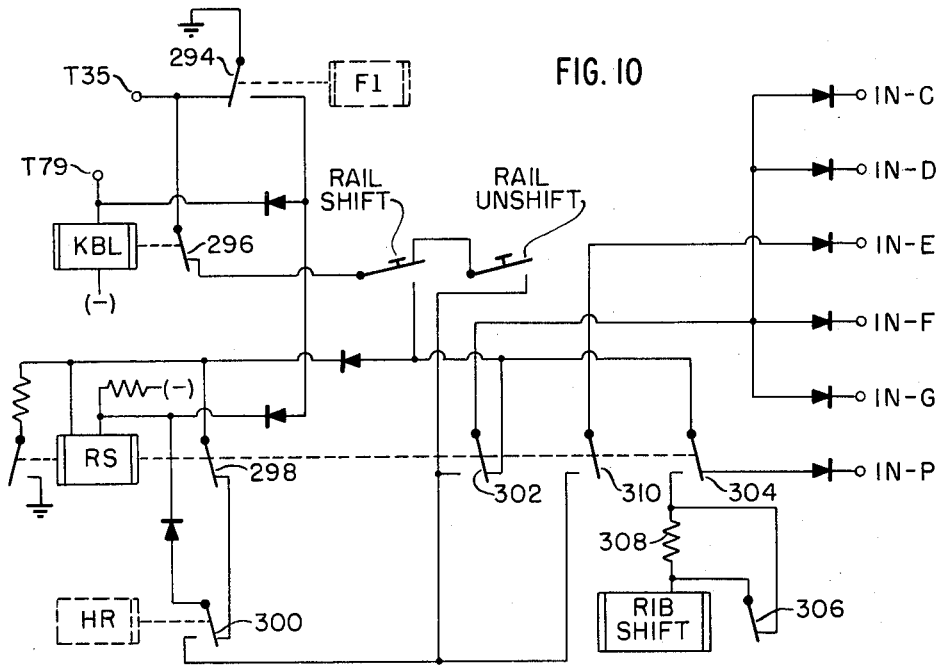

The operation is as follows. Referring to FIG. 10, depression of the pushbutton RAIL SHIFT completes a ground connection to the coil of a rail shift relay RS through break contacts 294 of the relay F1 and break contacts 296 of the relay KBL. The same ground connection shunts the relay RS through its break contacts 298 and break contacts 300 of the relay HR. A ground connection is also completed through break contacts 302 of the relay RS to the terminals IN-B, IN-C, IN-F and IN-G to enter in the register the code B, C, F, G, and through break contacts 304 of the relay RS to the terminal IN-P to complete the "rail shift" code. The code entry to the register is accomplished by the circuits previously described for other register entries and is followed by energization of the relay HR. When this relay opens its contacts 300 (FIG. 10) the shunt circuit to the relay RS is disconnected and the latter operates. This opens the ground connection to the hammer solenoids. The ground connection now passes through the make contacts 304 of the relay RS to energize a ribbon shift solenoid RIB SHIFT, this solenoid operating through conventional linkages on the typewriter associated with the keyboard to cause the following characters to appear on the visible typewritten copy in a different color to show that they being selected in the upper rail. This solenoid has break contacts 306 which shunt a resistance 308 when the solenoid is energized and open after it is energized to permit the resistance to lower the holding current to a lesser value sufficient to hold the solenoid in the shifted position.

To return to the lower rail, the pushbutton RAIL UNSHIFT is depressed. This completes a ground connection through the break contacts 294 of the relay F1, the break contacts 296 of the relay KBL, the break contacts of the pushbutton RAIL SHIFT, the make contacts of the pushbutton RAIL UNSHIFT, the make contacts 302 of the relay RS and the terminals IN-B, IN-C, IN-F, and IN-G to enter the corresponding codes in the register, and a ground connection is also made through make contacts 310 of the relay RS to the terminal IN-E, thereby completing the code entry for a shift to the lower rail. Upon completion of this entry to the register, the relay HR is energized and the foregoing ground connection is completed through its make contacts 300 to shunt the relay RS. Release of the latter relay opens the energizing circuit to the soleonid RIB SHIFT. This restores the circuit to the condition originally assumed.

If the pushbutton RAIL SHIFT is in the depressed position at the termination of a line, then upon energization of the relay F1 as previously described in connection with the transcription sequence, a ground connection is completed through its make contacts 294 (FIG. 10) to shunt the relay RS. A ground connection is also completed to energize the relay KBL. Referring to FIG. 9, the circuit which energizes the relay TR as previously described is also connected through contacts RC-IC INTERLOCK and a terminal T79 (FIG. 10) to energize the relay KBL. These two circuits for energizing the relay KBL are of overlapping time durations because the relays F1 and F3 have overlapping periods of energization. These interlock contacts are arranged to prevent the input carriage of the register from overtaking the reading carriage during the typing of a line, and prevent the entry of the first character in a new line until the reading carriage has advanced ahead of the input carriage. As soon as this happens these contacts open, the relay KBL is released and a ground connection is made through the break contacts 294 of the relay F1, the break contacts 296 of the relay KBL, the make contacts of the pushbutton RAIL SHIFT, and the circuits previously described for entry of a "rail shift" code in the register, energization of the relay RS and energization of the solenoid RIB SHIFT.

*Character spacing*

It is frequently found in composition of lines that a particular line cannot be terminated when it is either in the JPJ range or the JPN range. Provision is therefore made for terminating lines below the JPJ range and causing such lines to be transcribed to the tape with added thin spaces, of value "4" or any other assigned value between the letters of selected words. The value "4" is assumed in this description by way of example. By consulting the maximum thin spaces indicator (FIG. 7) and the minimum thin spaces indicator (FIG. 5), the operator may see the maximum and minimum number of thin spaces that would be required for the line in order that it may be terminated in the JPJ range. By then consulting the typewritten copy of the line, it may be determined whether there are one or more words in the line having intercharacter spaces having a total which falls within the range indicated by the maximum and minimum indicators. Referring to FIG. 14, there is provided a character spacing selector having seven pushbuttons numbered to correspond with the numerical order of the words in the line. If one or more of the first seven words in the line have a total number of intercharacter spaces which falls between the values represented by the maximum and minimum indicators, the appropriate combination of pushbuttons is depressed and the line may then be terminated and will be transcribed with thin spaces between the characters of each word selected. It will be evident that, in addition to the insertion of these thin spaces, the spacebands will be transcribed with en spaces, as in the case of lines terminated in the JPJ range, previously described. This is described below as the first case of character spacing.

In some lines a second case may occur, in which it is found that no combination of the first seven words in the line has a total number of intercharacter spaces which equals a value between those indicated by the maximum and minimum indicators. In this case the operator depresses the key THIN-J (FIG. 7), and as described above, the value represented by the maximum thin spaces indicator then increases to represent the maximum number of thin spaces that could be added to the line without causing it to exceed the selected justified line length. The line may then be terminated if it is possible to select a combination of pushbuttons on the character spacing selector (FIG. 14) for which the total number of intercharacter spaces in the selected words equals any value between the original maximum indication and the new maximum indication. In this case the line is transcribed to the tape with thin spaces between the characters of the selected words, but with no en spaces inserted with the spacebands, for it will be apparent that the number of thin spaces that will be added to the selected words will be sufficient to bring the line within the JPN range.

The first case described above is next considered in detail. It may be assumed, for example, that the first and third words of a line are to be thin spaced. The word selection buttons "1" and "3" are first depressed, and the key CARRIAGE RETURN (FIG. 9) is then depressed. A ground connection is then completed through parallel make contacts of the selected pushbuttons (FIG. 14) to energize a relay CSR and through a terminal T42 (FIG. 9) and a circuit including the key CARRIAGE RETURN to energize the relay E1 and initiate the transcription process described previously. Through a terminal T30 (FIG. 9), this ground connection energizes the relay JSR (FIG. 14) through break contacts of the relay JP1 and LS0. The relay JSR remains energized throughout the transcription of the line. As stated above, the reading carriage is arranged to return at the beginning of each line to a register position one step in advance of the first position in which pins are depressed. Therefore, on the first sensing operation none of the register repeating relays is energized. In the transcription sequence, when a ground connection is made through the contacts CAM4 it reaches the terminal T7 (FIG. 12), and is connected to a terminal T48 through series-connected break contacts of all of the register relays B, C, D, E, F, G and P. From this terminal (FIG. 14) the ground connection passes through make contacts 312 of the relay CSR to energize the relays CSA and CA. The operation of the relay CA closes its make contacts 314 which completes a circuit from the terminal T68 to the solenoid RCA, SOL, thus allowing a ground connection through the contact CAM1, (FIG. 9) to be completed through this solenoid. The energizing circuit for this solenoid is described above in connection with normal transcription. The relay CSA is part of a flip-flop circuit also including the relay CSB. The relay CSB is energized upon the disappearance of the foregoing ground connection to put the flip-flop circuit in its "1" condition.

After the reading carriage advances to the first character position in the register, the first character is sensed, and as previously described a ground connection is made through the contacts CAM4 to the terminal T7 (FIG. 12). Assuming for example that this character is a lower case character, the ground connection passes through the make contacts 134 of the relay N, the break contacts 142 of the relay A, the break contacts 144 of the relay SHB, a terminal T17 (FIG. 14), the make contacts 146 of a relay SCS now energized through the first position of a character spacing stepping switch CSS (the first position being grounded through the "1" pushbutton of the character spacing selector), a terminal T23 (FIG. 12), break contacts 314 of the relay B and a terminal T24 (FIG. 14). This ground connection operates the flip-flop circuit to put it in the "0" condition upon termination of this ground connection. The ground connection on the terminal T24 also passes through make contacts 316 of the relay CSB and a terminal T22 (FIG. 12) to energize the punch solenoids corresponding to the sensed character.

When the next code in the register is read, the ground connection through the contacts CAM4 (FIG. 9) passes through the terminal T7 (FIG. 12) to the terminal T17 (FIG. 14), through the make contacts 146 of the relay SCS, the terminal T23 (FIG. 12), the break contacts 314 of the relay B and the terminal T24 (FIG. 14) to operate the flip-flop circuit of FIG. 14. This ground connection also finds a circuit through the break contacts 316 of the relay CSB to energize the punch solenoid to punch the code B, this code designating a thin space. The relay CSA is immediately energized, and by opening its contacts 149 prevents the energization of the solenoid RCA SOL at the end of this reading cycle. When the foregoing ground connection is terminated, the relay CSB is energized to put the flip-flop circuit to its "1" condition.

The same character in the register is then sensed a second time. The ground connection through the contacts CAM4 reaches the terminal T7 (FIG. 12) and passes through the terminal T17 to FIG. 14, through the make contacts 146 of the relay SCS to the terminal T23 (FIG. 12), and through the break contacts 314 of the relay B and the terminal T24 (FIG. 14) to operate the flip-flop circuit and release the relay CSA. This ground connection also passes through the make contacts 316 of the relay CSB to the terminal T22 (FIG. 12) and then to the appropriate punch solenoids as previously described to punch the code for a corresponding character.

In the foregoing manner, each following character of the first word is sensed twice, the first sensing operation causing a thin space code B to be punched in the tape, and the second causing the sensed character code to be punched.

At the end of the first word the spaceband code S, E is sensed, and a ground connection from the contacts CAM4 passes from the terminal T7 to the terminal T12 (FIG. 12), and this ground connection (FIG. 14) passes through the make contacts 282 of the relay JSR. It will be recalled from the foregoing description of spaceband transcription for lines in the JPJ range that this connection results in punching an en space code in the tape. Upon the termination of this ground connection the flip-flop reaches its "1" condition. The reading carriage is not advanced because its energizing circiut is interrupted by the contacts 149 of the relay CSA.

When the code S, E is sensed a second time, the ground connection from the contacts CAM4 which reaches the terminal T12 (FIG. 14) passes through the make contacts 282 and 286 to punch the code E and energize the switch CSS through the make contacts 318 of the relay CSR. The same ground connection puts the flip-flop circuit in the "0" condition and the contacts 149 of the relay CSA restore the circuit for advancing the reading carriage.

The switch CSS reaches the "2" pushbutton which is not depressed. Accordingly, the second word will not be thin spaced. The next spaceband code that is sensed will again step the switch CSS, and in the third position this switch will again cause the flip-flop circuit to be sent to the "1" condition. It will be seen that the relay SCS is energized each time a word to be thin spaced is reached.

Figure 17:
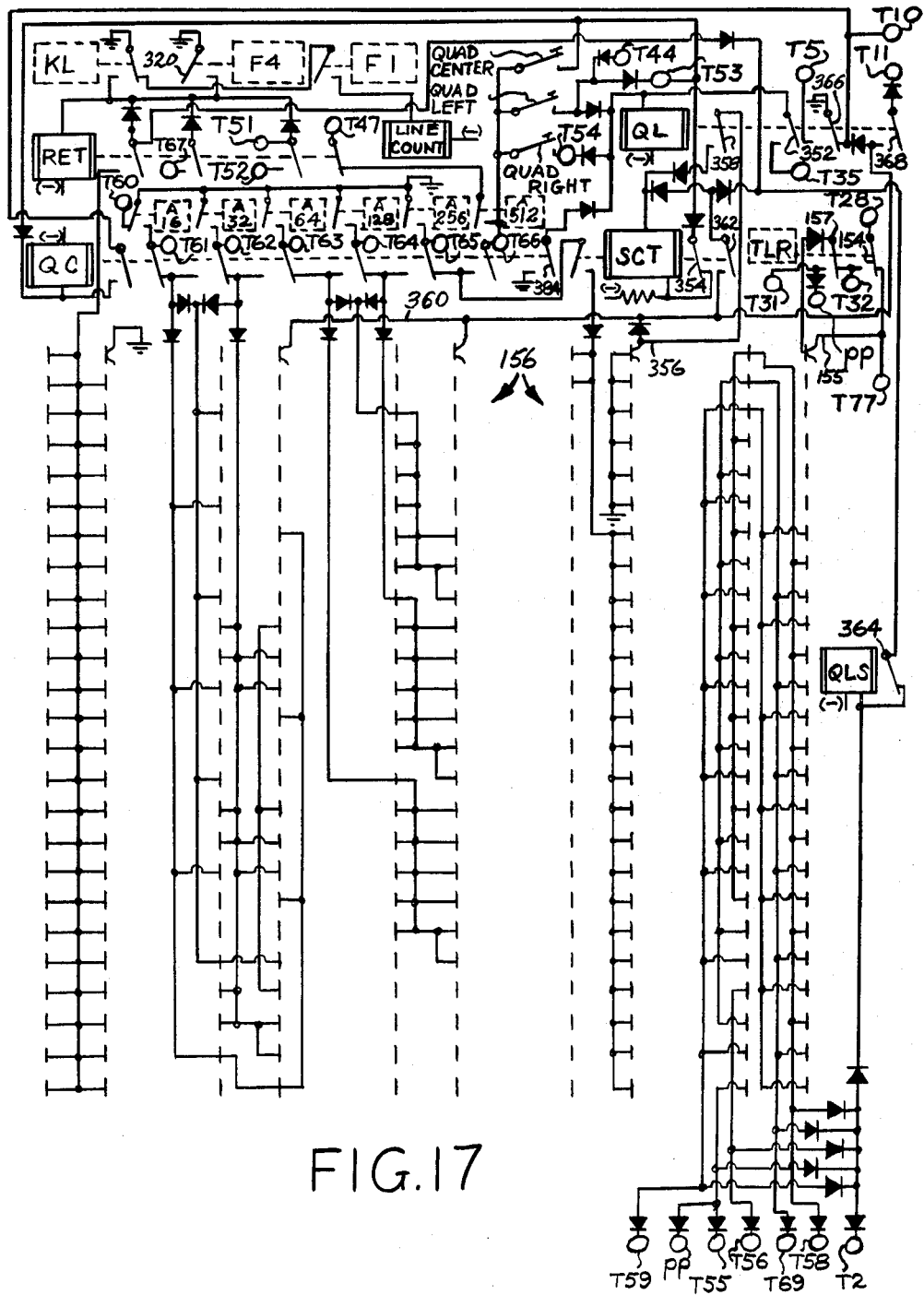

Referring to FIG. 17, a relay RET is energized upon operation of the relay F4 (FIG. 9) through make contacts 320 of the latter. Referring to FIG. 14, make contacts 322 of the relay RET operate the self-cycling level of the switch CSS and the latter returns to its initial position. Make contacts 323 of the relay F4 close when transcription of the line is completed to energize a solenoid LS which mechanically releases all of the depressed pushbuttons of the character spacing selector.

The second case of character spacing previously described, in which the THIN-J button 67 (FIG. 7) has been depressed, results in a sequence of operations similar to that described above, except that energization of the relay LSO through closure of this key opens its contacts 324 (FIG. 14) in the energizing circuit of the relay JSR, thereby preventing the latter relay from being energized when the line is terminated and preventing the transcription of en spaces with the spacebands.

*Indenting*

Figure 13:
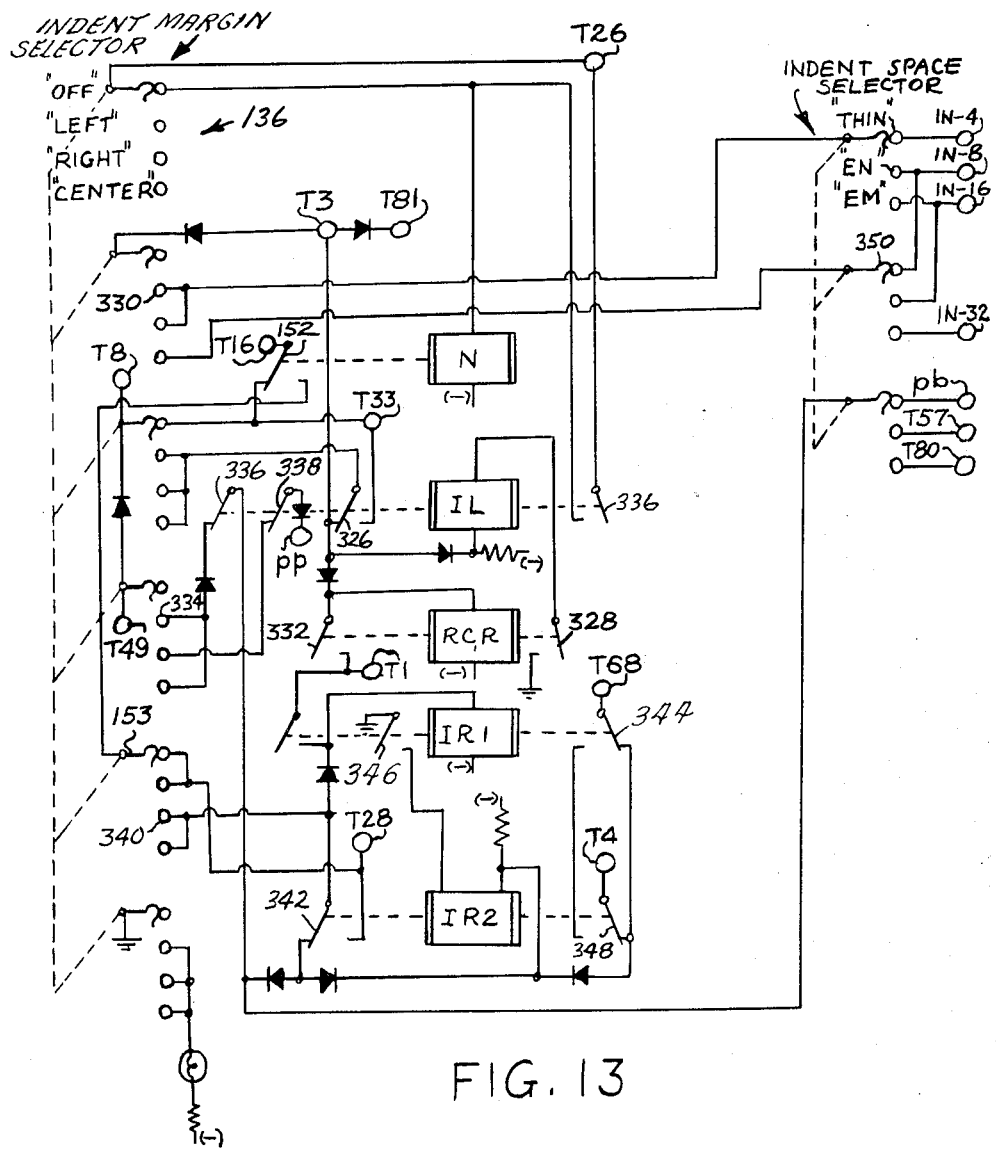

Provision is made for the indention of lines by means of an indent space selector and an indent margin selector (FIG. 13). These selectors are preferably rotary switches. The indent space selector has provision for selection of a thin space, an en space or an em space margin, and the indent margin selector has provision for inserting the selected indent space at the left margin of a line, at the right margin or at both margins. After these switches have been set for indention, it is necessary to enter in the width accumulator at the beginning of the typing of the line the value of the indention or indentions. This entry to the accumulator is conveniently carried out by depressing the key KILL LINE (FIG. 9). At the end of the typing of an indented line, the width of the indention in the following line is automatically sent to the accumulator if the indention selectors are still depressed. If a line is set for left indention, the machine will perforate in the tape the code for the selected space in the position preceding the first code in the line which is not a rail shift or unshift code. If the line is set for right indention, this code will be perforated when the "return" code S, F is sensed. When center indention is selected, the code for the selected space is entered in the tape before the first code in the line and when the "return" code S, F is sensed.

The circuit for indention at the left margin is described as follows. It will be assumed, for example, that an em space is to be inserted at this margin. The indent margin selector (FIG. 13) is set to the "left" position and the indent space selector is set to the "EM" position.

The key KILL LINE (FIG. 9) is next depressed for the purpose of entering in the accumulator the value "16" corresponding to the indention. As previously described, this results in a normal end-of-line sequence including the entry of the "return" code S, F and the "elevate" code S, D. The first ground connection through the contacts CAM4 after the relay TR is energized is connected through the make contacts 126 of the relay KL (FIG. 9) and a terminal T8 (FIG. 13), and through the selected level of the indent margin selector and break contacts 326 of a relay IL to energize a relay RCR and shunt the relay IL. The relay RCR is immediately energized to close its contacts 328, thereby grounding the energizing circuit for the relay IL, now shunted. This same ground connection also passes through a selected contact 330 of the margin selector and a selected contact of the space selector to the terminal IN–16 input to the width accumulator. The ground connection also passes through a terminal T81 (FIG. 4) to permit operation of the width accumulator as previously described. The ground connection also passes through a terminal T3 (FIGS. 9 and 13) to energize the relay RCC, this relay opening its contacts 118 to interrupt the operation of the reading carriage advance solenoid. When this ground connection is terminated, the relay IL (FIG. 13) loses its shunt connection and is energized. The relays RCR and IL are provided with a locking circuit through make contacts 332 of the relay RCR, a terminal T1 (FIG. 9) and the make contacts 176 of the relay TR. The codes S, F and S, D are sensed in the register, but no code is punched in the tape because of the operation of the contacts 126 of the relay KL interrupting the normal ground connection from the contacts CAM4 to the terminal T7 (FIG. 12).

The line to be typed with indention is then entered in the register in the same manner as for a normal line, and is terminated in the manner previously described for a justified line. Termination of this line results in the normal end-of-line input sequence, including the entry of the codes S, F and S, D. The reading carriage reaches its position to begin the transcription of the line as previously described. When the first character code in the register is sensed, the ground connection from the contacts CAM4 (FIG. 9) to the terminal T7 (FIG. 12) reaches the terminal T49 through the break contacts 134 of the relay N, the latter terminal being connected with two levels of the margin selector (FIG. 13). This ground connection passes through the break contacts 326 of the relay IL to energize the relay RCR and shunt the relay IL. The relay RCR again closes its contacts 328 to the energizing circuit of the relay IL, now shunted. This ground is also connected through the terminal T3 (FIG. 9) to energize the relay RCC and again delay the operation of the reading carriage advance solenoid. Also, a ground connection is completed through a selected contact 334 of the margin selector, and the connection is completed through break contacts 336 of the relay IL through a terminal T80 on the space selector, from which a circuit is completed to the punch solenoids to punch the code B, C, E (FIG. 18), this being the code for an em space. At the same time, this ground connection through the terminal T49 (FIG. 13) reaches the contact 330 on the margin selector to ground the terminal IN–16 to insert "16" in the accumulator for the next following line.

Upon the disappearance of the ground connection described above, the relay IL is energized by the interruption of its shunt circuit. The latter relay closes its contacts 336 to energize the relay N through a terminal T26 (FIG. 18) and the brush 138 of the right quadding stepping switch 140. The operation of the relay N causes the ground connection through the contacts CAM4 to the terminal T7 (FIG. 12) to find a circuit through the make contacts 134 of the relay N, allowing the character code to be punched in the tape the second time it is sensed. The relays RCR and IL remain energized throughout the transcription of the line and are finally released by opening of the contacts 176 of the relay TR (FIG. 9) when the latter is deenergized.

If the selector switches of FIG. 13 are left in the position described above, each succeeding line will be sensed in the register with a delay following the sensing of the first character, at which time the em code will be punched and the "16" entry will be made in the accumulator for the following line as described above.

It will be noted from FIG. 12 that no ground connection is completed from the terminal T7 to the contacts 134 of the relay N if a rail shift or unshift code is sensed; hence, these codes are punched in the tape before the width code selected for the indention.

If the indention selectors of FIG. 13 are set to insert an indention at the right margin, the key KILL LINE (FIG. 9) is then depressed as for an indention at the left margin. The line is typed and terminated in the same manner as for justified lines. When the reading carriage senses the first code in the register the relays RCR (FIG. 13) and RCC (FIG. 9) are energized and the relay IL (FIG. 13) is shunted, the terminal IN-16 being grounded (in the assumed case for an em space), all as previously described. Since the "right" position of the margin selector (FIG. 13) is selected, the ground connection through the terminal T49 for these operations finds a circuit through break contacts 338 of the relay IL to the punch terminal pp. As in the case previously described, upon the termination of this ground connection, the relay IL is energized and closes its contacts 336 to the terminal T26 (FIG. 18) to permit energization of the relay N. The same character code is sensed a second time and transcribed to the tape. The rest of the line is sensed and punched in the normal manner.

When the code S, F is sensed after the last character in the line, the ground connection through the contacts CAM4 to the terminal T7 (FIG. 12) finds a circuit to a terminal T16 (FIG. 13) and through the make contacts 152 of the relay N to a selected contact 340 of the margin selector. This causes energization of a relay IR1 and shunts a relay IR2 through break contacts 342 of the latter. The same ground connection also finds a circuit to the terminal T80 (FIG. 18) through which the punch solenoids punch the selected em space code B, C, E. Operation of break contacts 344 of the relay IR1 interrupts the circuit for energizing the reading carriage advance solenoid RCA SOL (FIG. 14), this circuit having been previously described.

When the foregoing ground connection is terminated, the relay IR2 is energized through make contacts 346 of the relay IR1, the shunt circuit for the relay IR2 having been released from its ground connection. Operation of make contacts 348 of the relay IR2 reestablishes a connection between the terminals T4 and T68 which form a part of the circuit for energizing the solenoid RCA SOL.

The code S, F is sensed a second time, and a ground connection through the contacts CAM4 to the contact 340 of the margin selector (FIG. 13) finds a circuit through the make contacts 342 of the relay IR2, the terminal T28 (FIG. 17) the break contacts 154 of the relay TLR, the brush 155 of the switch 156, the break contacts 157 of the relay TLR, a terminal T32 (FIG. 15) and the contacts 158 of the relay LDR 2 to punch the "return" code F in the tape. The reading carriage then advances and senses the code S, D and completes the transcription of the line. Thus the code for an em space has been inserted after the last character of the line, leaving a margin of that width on the right.

Center indention provides equal margins on the left and right ends of a line. This operation is a combination of the left and right indention operations previously described. The selector switches are set in the same manner described above and the codes are entered in the same manner. Sensing of the first character code inserts a space on the left end of the line, and sensing of the code S, F inserts a space on the right side. The principal difference between this operation and those previously described relates to the input values to the accumulator. These values will be double the values inserted for either a left or right indention. The doubling of values to the accumulator is accomplished through a brush 350 of the indent space selector (FIG. 13) which selects the terminal IN-8 for a thin space selection, the terminal IN-16 for an en space selection, and the terminal IN-32 for an em space selection.

Quadding

The quadding functions of the machine are controlled by three pushbuttons (FIG. 17), QUAD CENTER, QUAD LEFT and QUAD RIGHT. When the pushbutton QUAD LEFT is depressed, the deficit in the line which has just been typed is represented by the unenergized stages of the width accumulator. This deficit, divided by "16," is transferred to the left quadding stepping switch 156 (FIG. 17) having an operating coil QLS. If, when the deficit is divided by "16," there is a remainder of "8" or greater, the remainder is stored in a relay AIR-1 (FIG. 18). The left quadding switch 156 is self-cycled to the corresponding position. Then, the line is terminated with the usual entries of the codes F, S and F, D as previously described.

When the pushbutton QUAD RIGHT (FIG. 17) is depressed, the deficit is similarly stored in the right quadding switch 140 (FIG. 18) and a relay AIR-2 shown in the same figure.

When the pushbutton QUAD CENTER is depressed, half of the deficit is stored in the left quadding switch 156 and the relay AIR-1, and the other half of the deficit is stored in the switch 140 and the relay AIR-2.

During the transcription of a line to be quadded to the left, the necessary quads are transcribed to the tape at the end of the line. The quads are transcribed with cyclically-varying width values in the sequence en space, spaceband, em space, this sequence being repeated as many times as is necessary to make up the deficit. The quadding always ends with an em space, and may start with either an en space or an em space. The en space position nearest the end of the line will be transcribed as an en space if the relay AIR-1 is not energized, and as an em space if the relay AIR-1 is energized. The foregoing quad spaces are transcribed to the tape when the code S, F is sensed in the register, and continue until the stepping switch 156 reaches its initial position.

During the transcription of a line to be quadded to the right, the quads are inserted in the line before the other codes, except the rail shift and unshift codes, if any. When the right quadding switch 140 returns to its initial position after inserting the necessary quads, the first code in the line is sensed a second time, and the remainder of the line will be transcribed in the normal manner.

When a line is transcribed with quadding to the center, the quads are inserted both before and after the transcribed line. Both of the quadding stepping switches and the relays AIR-1 and AIR-2 are used in this case.

A description of a line to be quadded left, having a deficit of four en spaces, is as follows.

The pushbutton QUAD LEFT (FIG. 17) is depressed, connecting ground from the break contacts 176 (FIG. 9) of the relay TR through a terminal T47 (FIG. 17), break contacts of the relay RET and make contacts of the relay A512 to energize a relay QL having a locking circuit including its make contacts 352, a connection through a terminal T35 (FIG. 10) and break contacts 294 of the relay F1 to ground. Closure of this pushbutton also shunts a relay SCT through its own break contacts 354. When the pushbutton is released, the relay SCT is energized by a ground connection through contacts of a level of the switch 156 to a brush 356 and make contacts 358 of the relay QL. The brushes of three 50-position levels of the switch 156 (shown in its first position) are connected together. Ground connections are supplied to the contacts of these levels through contacts of the width accumulator A-relays, these ground connections passing through a wire 360 connected to the brushes of these levels and make contacts 362 of the relay SCT to lock the latter relay and to ground the self-cycling contacts 364 of the switch 156. This switch will then self-cycle in the well-known manner until it reaches a position for which there is no ground connection to the wire 360. In the assumed case, the switch steps to its position "47" which is the first position in which no ground connection is made, that is, the first position in which the only connection that could be made to the wire 360 is through a contact that is not connected to ground because of the unenergized condition of the relay A32.

A ground connection which was completed through make contacts 366 of the relay QL, when the latter was first energized, and a terminal T5 (FIG. 9) to the energizing circuit of the relay EL initially fails to energize the latter because of the ground connection on the wire 360 (FIG. 17) which passes through make contacts 368 of the relay QL and a terminal T11 (FIG. 9) to shunt the relay EL. When the switch 156 reaches its position "47," the ground connection to the wire 360 is removed and the relay EL is energized, the relay SCT being released. The transcription sequence is initiated and the relay F1 is operated in the manner previously described. Referring to FIG. 10, operation of the relay F1 opens its contacts 294 which, through the terminal T35, forms a holding circuit for the relay QL (FIG. 17), and the latter is released. The end-of-line sequence proceeds in the manner previously described until the code S, F is sensed. The contacts CAM4 form a ground connection through the terminal T7 (FIG. 12) to the terminal T16 (FIG. 13), through the make contacts 152 of the relay N, through the brush 153 of the indent margin selector, through a terminal T28 (FIG. 17), to the brush 155 of the switch 156. This ground connection, which normally reaches the terminal T32 (FIG. 15) and punches the code F, is interrupted because the switch 156 is not on its first position. This ground connection passes through the brush 155 to the 47th contact of its bank. The latter contact in turn (a) connects the ground to the stepping solenoid QLS of the switch 156, which steps the switch at the end of the ground connection, (b) connects the ground through a terminal T2 (FIG. 9) to energize the relay RCC to interrupt the energizing circuit of the solenoid RCA SOL, previously, and (c) passes through a terminal T56 (FIG. 18) through break contacts of the relays TLR and TRS to the punch solenoids to enter in the tape the code B, D, E, F, P, this being the code for an en space.

As previously explained, upon the termination of this ground connection, the switch 156 steps to its position "48." The next ground connection through the contacts CAM4 again passes through the circuit previously described to the brush 155 of the switch 156. This ground connection passes through the contact "48," a terminal T69 (FIG. 18) and break contacts of the relay TLR to punch the code E for a spaceband in the tape. The relay RCC (FIG. 9) is again energized, and upon the termination of this ground connection the switch 156 steps to its position "49."

The next ground connection through the contacts CAM4 again reaches the brush 155 of the switch 156, and passes through the contact "49" of its level and a terminal T59 (FIG. 18) to send the code B, C, E to the tape, this being the code for an em space. This ground connection again energizes the relay RCC (FIG. 9), and at the end of the ground connection the switch 156 advances to its position "50."

The next ground connection through the contacts CAM4 again causes energization of the relay RCC (FIG. 9), and a ground connection passes through the terminal T55 (FIG. 18) to shunt the relay AIR-1 (assumed in the above case not to be energized). At the end of the ground connection the switch 156 steps to its first position. The foregoing ground connection will also have been connected to a terminal pp (FIG. 17).

The next ground connection through the contacts CAM4 punches the code F in the tape through the normal transcription circuit for this code passing through the terminal T7 (FIG. 12) to the terminal T16 (FIG. 13), the terminal T28 (FIG. 17) the terminal T32 (FIG. 15) and the break contacts 158 of the relay LDR2. The reading carriage advances to the next position and senses the code S, D, thereby completing the transcription of the line.

If the assumed line were to have been terminated when there were five en spaces of deficit, the above-described sequence would be varied as follows. Referring to FIG. 18, a ground connection would be made through break contacts 370 of the relay A8, break contacts 371 of a relay QC, make contacts 372 of the relay QL and make contacts 374 of the relay SCT to energize the relay AIR-1. In this case, when the switch 156 (FIG. 17) is in the position "47" a ground connection would be made through the terminal T56 (FIG. 18), make contacts 375 of the relay AIR-1 and break contacts of the relays TLR and TRS to punch the code B, C, E in the tape, thereby changing the normal en space code to an em space code to compensate for the additional deficit in the accumulator when the line was terminated.

We next turn to a description of a line to be quadded right. Referring to FIG. 18, the relays QR and SCC would be energized in a manner similar to that previously described for the relays QL and SCT of FIG. 17, by operation of the pushbutton QUAD RIGHT (FIG. 17) connecting ground through a terminal T54 (FIG. 18). The switch 140 self-cycles to its position "47." The relay EL is energized as soon as the switch completes its self-cycling through make contacts 376 of the relay QR and a terminal T5 (FIG. 9).

Since the switch 140 is not in its first position at the beginning of the transcription of the line, the relay N will not be energized. The first ground connection through the contacts CAM4 which occurs when the sensed code is not a rail shift or unshift is connected through the break contacts 134 of the relay N (FIG. 12) and a terminal T49 (FIG. 13) to a terminal T33 (FIG. 18) connected with a brush on the switch 140. This brush is connected with the contact in position "47" and permits energization of the relay RCC through a terminal T3 (FIG. 9). The stepping solenoid QRS is also energized. This contact also makes a connection through break contacts 377 of a relay AIR-2 and break contacts of the relays TLR and TRS to punch the code B, D, E, F, P, this being the code for an en space. When the ground connection is terminated, the switch 140 steps to its position "48."

The same register position will be sensed again, and a ground connection from the contacts CAM4 will again be connected through the terminal T33 (FIG. 18), and through the contact in position "48" to the solenoid QRS and the relay RCC. A connection is also made through break contacts 378 of the relay TLR to enter the spaceband code E in the tape. At the end of this ground connection the switch 140 steps to its position "49."

The next ground connection through the contacts CAM4 through the terminal T33 (FIG. 18) will enter the code B, C, E for an em space. At the end of the ground connection the switch 140 steps to its position "50." In the position "50" the terminal pp is grounded and the relay AIR-2 (assumed not to be energized in this case) is shunted in a manner similar to the quad left case previously described. At the end of the ground connection the switch 140 steps to its first position.

As soon as the switch 140 reaches its first position the relay N is energized. When the code in the register is sensed again the ground connection through the contacts CAM4 reaches the terminal T7 (FIG. 12) and passes through the make contacts 134 of the relay N, the terminal T17 (FIG. 14), the break contacts 146 of the relay SCS and the terminal T22 (FIG. 12) to enter the sensed code in the tape. At the end of the pulse the reading carriage advances and transcription is completed in the manner previously described.

If the line were sent quad right with five en spaces of deficit the operation would be similar to that previously described except that the relay AIR-2 (FIG. 18) would be energized when the pushbutton QUAD RIGHT was depressed, through the break contacts 370 of the relay A8 the break contacts 371 of the relay QC, make contacts 380 of the relay QR and make contacts 382 of the relay SCC. The ground through the position "47" of the switch 140 from the terminal T33 would pass through the make contacts 377 of the relay AIR-2, through break contacts of the relays TLR and TRS to punch the code B, C, E in the tape, this being the code for an em space.

When the pushbutton QUAD CENTER is depressed, a relay QC is energized. This relay closes its contacts 384 to energize both of the relays QL and QR. In this case, if the relay A16 (FIG. 17) is released it will ground a terminal T60 (FIG. 18) which will form a circuit through make contacts 371 of the relay QC to energize both of the relays AIR-1 and AIR-2. The relay QC has contacts which shift the connections from the width accumulator A-relays to the contacts of both of the switches 140 (FIG. 18) and 156 (FIG. 17). This causes both of the switches to self-cycle to positions such that half of the deficit appears in each switch. During transcription the switch 140 causes half of the quads to be inserted at the beginning of the line and the switch 156 causes the other half of the quads to be inserted at the end of the line.

It will be noted that the output of both of the quadding switches to the tape punch solenoids are connected through contacts of the relay TRS so that the correct codes are sent to the tape according to whether the line is sent on or off the rail, as will be more clearly understood from the heading below entitled, "Inserting Leaders and Spaces."

Inserting leaders

Figure 16:
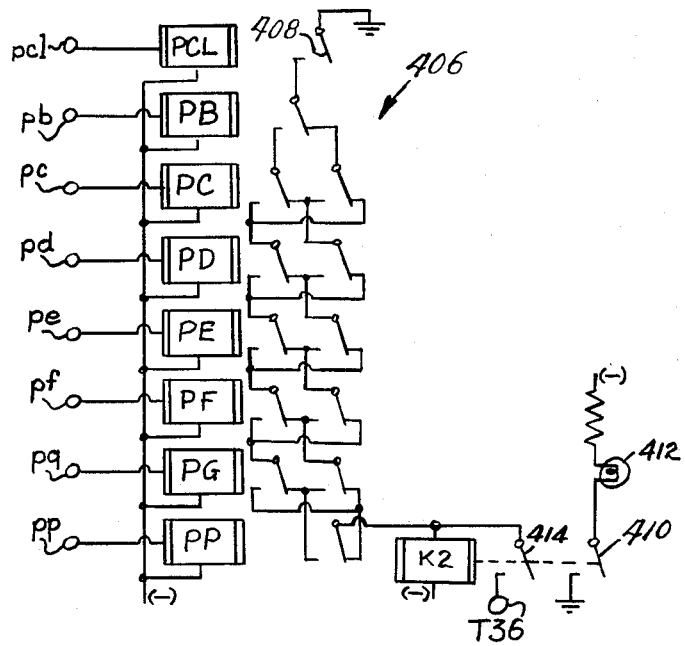

Referring to FIG. 16, a key LEADER is depressed when it is desired to insert leader characters at a designated position in the line, having sufficient space to account for the deficit that may be present when the line is terminated. The line is then terminated in the normal manner for a justified line. The deficit will be transferred to the quad left switch 156 (FIG. 17) and the associated relay AIR-1 in a manner similar to that for a line to be transcribed quad left. During transcription, at the designated position in the line in which the leader core S, B appears, the code for a spaceband is transcribed, followed by the leader characters. A detailed description of the circuit is as follows.

When the key LEADER is depressed, ground is connected to the terminals IN-S and IN-B to enter the leader code. A connection is also made to ground a terminal IN-MIN, which is an input terminal to the width accumulator to enter a count corresponding to the minimum spaceband width. A relay CLR is energized and locks on its make contacts 386 through a terminal T35 (FIG. 10) and the break contacts 294 of the relay F1. Referring to FIG. 6, ground through make contacts 388 of the relay CLR energizes the relay JP1. Ground through the make contacts 240 of the relay JP1 energizes the relay JP2. Ground through the make contacts 242 of the relay JP2 and the make contacts 244 of the relay JP1 energizes the light JPN.

Referring to FIG. 9 when the key CARRIAGE RETURN is closed, a ground connection is made through make contacts 392 of the relay CLR, a terminal T44 (FIG. 18) and break contacts 394 of the relay CIB to energize the relay TLR. The relay TLR is locked through a terminal T20 (FIG. 9) and break contacts 396 of the relay F4. Transcription of the line proceeds in the normal manner previously described.

When the code S, B is sensed in the register, the ground connection through the contacts CAM4 causes the spaceband code E to be punched in the tape through a circuit from the terminal T7 (FIG. 12) through the make contacts 128 of the relay S, make contacts 398 of the relay B, a terminal T21 (FIG. 15) and break contacts 400 of the relay LDR2. This same ground connection also operates a flip-flop circuit including the relay LDR2 and a relay LDR1. Referring to FIG. 9, make contacts 402 of the relay LDR1 close to energize the relay RCC and thereby interrupt the advance of the reading carriage. When the code S, B is sensed a second time, the foregoing ground connection to the terminal T21 (FIG. 15) passes through the make contacts 400 of the relay LDR2 and a terminal T77 (FIG. 17) to the brush 155 on the left quadding switch 156. As previously explained in connection with a line transcribed quad left, the output from this bank of the switch 156 passes through contacts of relays TRS and TLR (FIG. 18) to the punch solenoids. Since the relay TLR is energized, the en space code is changed to an en leader code, the em space code is changed to an em leader code, and the spaceband code is changed to an en leader code. The S, B code is sensed in the register repeatedly until the switch 156 has transcribed all of the necessary leader codes to the tape and returned to its first position. A code P is transcribed to the punch circuit in the position "50" of the switch 156.

When the switch 156 returns to its first position, the code S, B is sensed again. The ground connection to its brush 155 passes through the make contacts 157 of the relay TLR to a terminal T31 (FIG. 15) and shunts the relay LDR1. Referring to FIG. 9, the opening of the contacts 402 of the relay LDR1 releases the relay RCC and allows the reading carriage to advance. The transcription then continues in the normal manner.

Inserting blanks

The insertion of blanks is similar to the insertion of leader characters, except that in this case both of the relays CLR and CIB are energized by depression of the pushbutton BLANK. The energization of the relay CIB prevents the energization of the relay TLR by opening the contacts 394 (FIG. 18) in the energizing circuit. Since the relay TLR is not energized, the codes sent to the tape from the switch 156 during the transcription are the same as those sent for a line which is quadded left.

Parity checking

Referring to FIG. 16, a solenoid PCL operates a punch clutch which is energized to advance the tape after each punch operation. Referring to FIG. 12, the punch clutch is energized through a terminal PCL connected by the contacts CAM5 with a wire 404 that is grounded through one or more parallel make contacts of the register relays B, C, D, E, F and G whenever a punch code is sent to the tape as described above.

FIG. 16 shows a parity checking circuit 406 associated with the tape punch solenoids PB, PC, PD, PE, PF and PG. A solenoid PP, which is not associated with a tape position, also forms a part of the parity checking circuit. This circuit is grounded through make contacts 408 of the solenoid PCL, and is of a well-known type which energizes a relay K2 whenever the total number of solenoids PB, PC . . . PP that is energized is an even number. It will be evident from the foregoing description that the codes are intentionally arranged so that this condition does not arise during the correct operation of the circuits described. Only odd code combinations are recorded in the register and only odd combinations are transcribed from the register to the tape punch circuit. This circuit, therefore, provides a check on the codes transcribed from the register.

If the relay K2 is energized it closes its make contacts 410 to light a trouble light 412, and locks on its make contacts 414 through a terminal T36 (FIG. 9) and break contacts 416 of the relay EL. The trouble light will therefore remain on until the operator again causes energization of the relay EL by the termination of the line he is typing. The operation of the machine is not otherwise affected by the operation of the checking circuit.

Inserting leaders and spaces

In a typical linecasting machine, one set of matrices is provided which have em leader characters in the off-the-rail position with em spaces in the on-the-rail position, and two identical sets of matrices are provided which have em spaces in the off-the-rail position with em leaders in the on-the-rail position. When the machine is operating off the rail, an em leader code is desired which will select a matrix in the first set, and em space codes are desired which will select matrices from the latter two sets alternately. When the machine is operating on the rail, an em leader code is desired which will select a matrix from one of the latter two sets, and an em space code is desired which will select a matrix in the first set.

Figure 8:
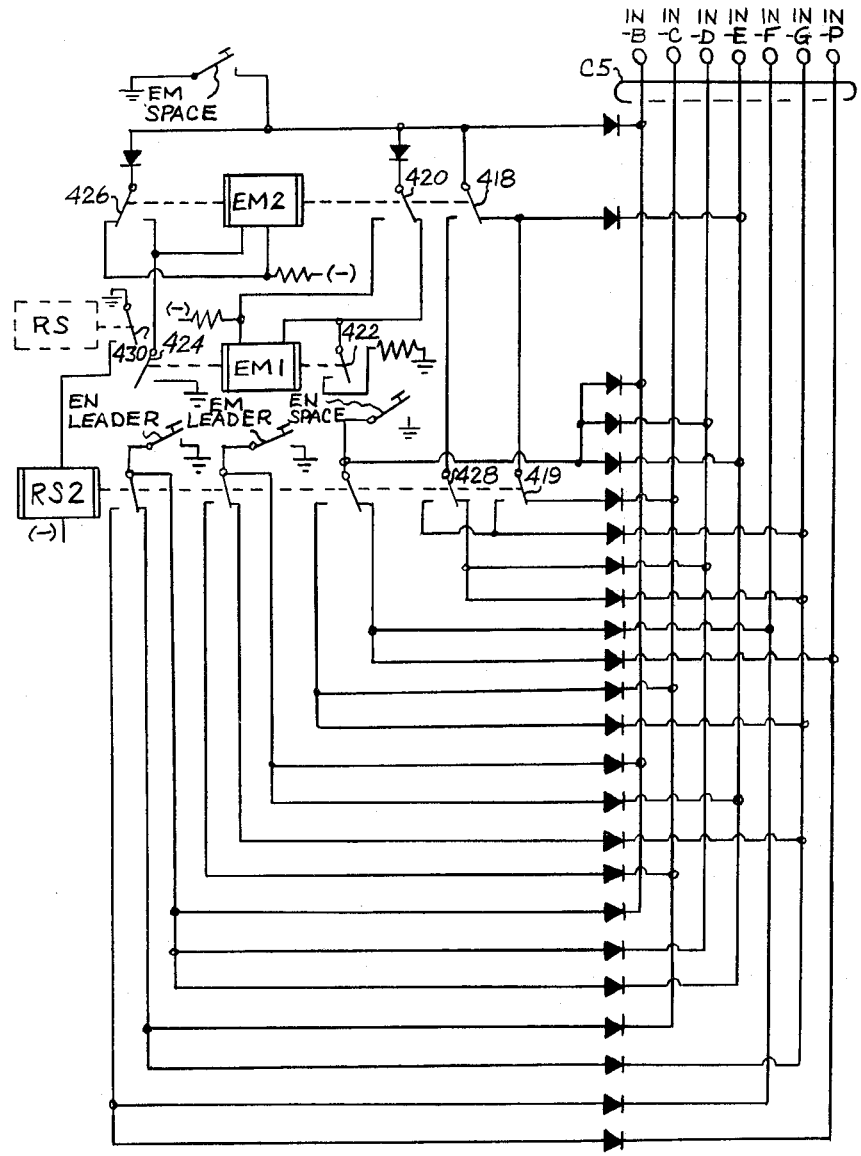

The machine is provided with means to accomplish these results automatically upon depression of a key EM SPACE and a key EM LEADER (FIG. 8). The alternate selection is carried out by a flip-flop circuit including relays EM1 and EM2. The operation of the circuit of FIG. 8 is affected by the position of the rail shift relay RS (FIG. 10). Assuming first that the latter relay is not energized, depression of the key EM SPACE connects ground directly to the terminal IN–B and through break contacts 418 of the relay EM2 and break contacts 419 of a relay RS2 to the terminals IN–C and IN–E to complete an input code B, C, E to the register, this being the code for one of the sets of em spaces. This ground connection also energizes a relay EM1 through break contacts 420 of the relay EM2. The relay EM1 locks on its make contacts 422 and closes its make contacts 424 to energize the relay EM2. However, the relay EM2 is shunted through its break contacts 426. Release of the key EM SPACE removes the shunt connection on the relay EM-2 and the latter is operated.

If the key EM SPACE is depressed a second time, the ground connection again reaches the terminal IN–B directly, and through the make contacts 418 of the relay EM2 and break contacts 428 of the relay RS2 completes a circuit to the terminals IN–D and IN–G to enter the input code B, D, G to the register, this being the code for the other set of em spaces. Through the make contacts 420 of the relay EM2, the relay EM1 is shunted and opens its contacts 424 in the energizing circuit of the relay EM2. However, the latter relay holds through its make contacts 426 until the termination of the ground connection, at which time the circuit is returned to its original condition.

If the key EM LEADER is depressed when the relay RS is not energized, a code B, E, G is always entered in the register.

Assuming next that the relay RS has been previously energized during the typing of a line as described under the heading "Shifting the Rail," this relay closes its make contacts 430 to energize the relay RS2. With the circuit in this condition, if the key EM SPACE is depressed, a ground connection is again made directly to the terminal IN–B, a connection is made through the break contacts 418 of the relay EM2 to enter the code E, and a connection is made through the make contacts 419 of the relay RS2 to enter the code G. This completes the code B, E, G to select the set of matrices which have the em space in the on-the-rail position. This same ground connection also energizes the relay EM1 through the break contacts 420 of the relay EM2, and thereby puts the flip-flop circuit in its "1" condition as previously described, upon termination of the ground connection.

If the key EM SPACE is depressed a second time, the code B is entered directly as in the previous cases, and a ground connection is made through the make contacts 418 of the relay EM2 and the make contacts 428 of the relay RS2 to enter the code G. A ground connection is also completed through the make contacts 428 and the make contacts 419 of the relay RS2 to enter the code E. This completes the code B, E, G which is the identical code entered upon the first depression of the key EM SPACE.

Depression of the key EM LEADER enters the code B, C, E in every case, since the relay RS2 is energized.

The keys EN LEADER and EN SPACE function in the same manner as the key EM LEADER, except that they enter different codes. The key EN LEADER enters the code B, C, D, E, G if the machine is off the rail, and the code B, D, E, F, P if the machine is on the rail. The key EN SPACE enters the code B, D, E, F, P if the machine is off the rail, and the code B, C, D, E, G if the machine is on the rail.

It will be appreciated that linecasting machines intended primarily for different types of application present other situations analogous to that described above in relation to em space and leader codes. In adapting the machine according to the present invention to such applications, the circuit described above has been found well suited. It will be apparent to one skilled in the art, after a reading of the foregoing description, that the technique herein described may be applied to other codes and keys which may be utilized to command corresponding functions of a linecasting machine.

For example, in some applications it is desired to provide a keyboard which will permit the selection of small capitals by using the same character keys normally used for upper and lower case characters on a standard keyboard after striking a special "small capital" key. It will be understood from the foregoing description that the codes put in the tape for the upper and lower cases of any characters are the same. However, the linecasting machine requires a different code to select small capitals. Therefore, a special relay comparable in function to the relay RS2 described above is energized by depression of the "small capital" key and transfers the character key contacts from the circuits which enter the normal codes previously described to circuits which enter the codes required to select small capitals.

From the foregoing description, it will be appreciated that the invention herein described is a versatile machine characterized by the ability to accommodate the manifold requirements of linecasting machinery, and requiring a minimum degree of complexity in the use of the controls by the machine operator. The operation of a machine according to this invention is quickly learned, and the resulting perforated tape is automatically produced in a form which will permit accurate and rapid operation of a linecasting machine. It will be understood that while the invention has been described in relation to a specific embodiment thereof, numerous variations in the particular circuits employed, in accordance with techniques now known to those skilled in the art, may be utilized to accommodate the invention to specific applications. Such variations in accordance with specific applications are considered to fall within the spirit and scope of this invention.

Having thus described the invention, I claim:

1. In typesetting, the method of translating character codes and space codes representing a text into codes adapted for transcription in justified lines, comprising the steps of generating the character codes and space codes in the consecutive order in which the corresponding characters and spaces appear in said text, simultaneously and separately measuring (a) the product of a cumulative number of space codes and a maximum expansion constant, and (b) a line deficit as indicated by the difference between a predetermined justified line length and a cumulative total of width values corresponding to the respective generated character codes including a minimum expansion constant for each generated space code, continuously comparing said deficit with a function of said product until the function exceeds the deficit, thereafter optionally continuously comparing said deficit with said product itself until the product exceeds the deficit, terminating the generating of character codes and space codes, and repeating the generated character and space codes consecutively, inserting a fixed code in the sequence with each space code if, when the generating of character codes and space codes was terminated, said function exceeded said deficit and said product did not exceed said deficit.

2. In typesetting, the method of translating character codes and space codes representing a text into codes adapted for transcription in justified lines, comprising the steps of generating and temporarily memorizing the character codes and space codes in the consecutive order in which the corresponding characters and spaces appear in said text, simultaneously and separately measuring (a) the product of a cumulative number of space codes and a maximum expansion constant, and (b) a line deficit as indicated by the difference between a predetermined justified line length and a cumulative total of width values corresponding to the respective generated character codes including a minimum expansion constant for each generated space code, continuously comparing said deficit with a function of said product until the function exceeds the deficit, thereafter optionally continuously comparing said deficit with said product itself until the product exceeds the deficit, terminating the generating of character codes and space codes, and thereafter repeating the temporarily memorized character codes and space codes consecutively, inserting a fixed code in the sequence with each space code if, when the generating of character codes and space codes was terminated, said function exceeded said deficit and said product did not exceed said deficit.

3. The method according to claim 1, in which the function is a multiple of the product.

4. In type composing apparatus, the combination of means to produce consecutive character and space codes, means to store the produced codes and to accumulate (a) the product of a cumulative number of space codes and a maximum expansion constant, and (b) a line deficit as indicated by the difference between a predetermined justified line length and a cumulative total of width values corresponding to the respective stored character codes including a minimum expansion constant for each stored space code, means to compare the deficit continuously with a function of said product and to produce a first signal when the function exceeds the deficit and operable by said first signal to compare the deficit continuously with the product itself and to produce a second signal when the product exceeds the deficit, means to send a line terminating signal at any time after the first signal, and means to repeat the stored character and space codes consecutively, said last-mentioned means being adapted to insert a fixed code in the sequence with each space code if the terminating signal followed the first signal but not the second signal.

5. In type composing apparatus, the combination of a keyboard having means to produce a code for each selected character and space in a line and a function code, a right indent margin selector, a memory device to store the codes, reading means adapted to sense the codes consecutively, an output device operated by the reading means to reproduce the codes, means to set the right indent margin selector in operation in advance of key operation for a line to be indented, and means operative by the function code sensed by the reading means following the reproduction of the last character code in said line, and conditioned on the operative state of the right indent margin selector, to produce in the output device a code corresponding to the indention.

6. In type composing apparatus, the combination of a keyboard having means to produce a code for each selected character and space in a line and a function code, a center indent margin selector, a memory device to store the codes, reading means adapted to sense the codes consecutively, an output device operated by the reading means to reproduce the codes, means to set the center indent margin selector in operation in advance of key operation for a line to be indented, and means operative by a code sensed by the reading means in advance of reproduction of the first character code in said line, and again operative by the function code sensed by the reading means following the reproduction of the last character code in said line, and conditioned on the operative state of the center indent margin selector, to produce in the output device a code corresponding to the indention.

7. In type composing apparatus, the combination of a keyboard having means to produce a code for each selected character and space in a line, an indent margin selector, a memory device to store the codes, an accumulator to totalize width values corresponding to the selected characters, reading means adapted to sense the codes consecutively, an output device operated by the reading means to reproduce the codes, means operative in advance of key operation for a line to be indented to set the indent margin selector in operation and to enter a width value corresponding to the indention in the accumulator, and means operative by a code sensed by the reading means and conditioned on the operative state of the indent margin selector to produce in the output device a code corresponding to said indention.

References Cited by the Examiner
UNITED STATES PATENTS

| | | | |
|---|---|---|---|
| 2,324,280 | 7/1943 | Colman | 234—7 |
| 3,171,592 | 3/1965 | Hanson | 234—6 |

WILLIAM W. DYER, Jr., *Primary Examiner.*
WILLIAM S. LAWSON, *Examiner.*